(12) United States Patent
Ishigure et al.

(10) Patent No.: US 10,894,239 B2
(45) Date of Patent: Jan. 19, 2021

(54) DISPERSANT, DISPERSION COMPOSITION, AND FIBROUS SHEET

(71) Applicant: MEISEI CHEMICAL WORKS, LTD., Kyoto (JP)

(72) Inventors: Shuichi Ishigure, Kyoto (JP); Harutaka Naruse, Kyoto (JP)

(73) Assignee: MEISEI CHEMICAL WORKS, LTD., Kyoto (JP)

( * ) Notice: Subject to any disclaimer, the term of this patent is extended or adjusted under 35 U.S.C. 154(b) by 250 days.

(21) Appl. No.: 15/310,645

(22) PCT Filed: Aug. 31, 2015

(86) PCT No.: PCT/JP2015/074811
§ 371 (c)(1),
(2) Date: Nov. 11, 2016

(87) PCT Pub. No.: WO2016/039218
PCT Pub. Date: Mar. 17, 2016

(65) Prior Publication Data
US 2017/0080397 A1   Mar. 23, 2017

(30) Foreign Application Priority Data
Sep. 8, 2014 (JP) .................................. 2014-182779

(51) Int. Cl.
*B01F 17/42* (2006.01)
*B01F 17/00* (2006.01)
(Continued)

(52) U.S. Cl.
CPC .......... *B01F 17/0028* (2013.01); *B82Y 30/00* (2013.01); *C01B 32/05* (2017.08);
(Continued)

(58) Field of Classification Search
CPC . B01F 17/0028; B82Y 30/00; C01B 33/1417; D04H 1/4218; D21H 17/53
See application file for complete search history.

(56) References Cited

U.S. PATENT DOCUMENTS 5,250,601 A   10/1993  Kubota et al.
7,446,233 B1  11/2008  Miyanaga
(Continued)

FOREIGN PATENT DOCUMENTS

CN   1319118    10/2001
CN   102292377  12/2011
(Continued)

OTHER PUBLICATIONS

Machine Translation of Publ. No. JP 2005-281665, published Jun. 2005, Japan Patent Office, Tokyo, Japan, online at https://dossier1.j-platpat.inpit.go.jp/tri/all/odse/ODSE_GM101_Top.action (Year: 2005).*

(Continued)

*Primary Examiner* — Michael A Salvitti
(74) *Attorney, Agent, or Firm* — Hamre, Schumann, Mueller & Larson, P.C.

(57) ABSTRACT

The present invention aims to provide a dispersant and a dispersion composition that exhibit high dispersing ability for nano-carbons such as, in particular, CNTs. The disper-
(Continued)

sant according to the present invention includes a polyalkylene oxide having a structural unit of the following chemical formula (1).

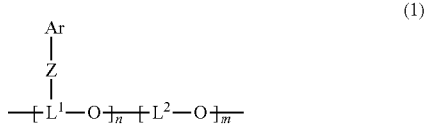

(1)

In the chemical formula (1),
$L^1$ and $L^2$ are each a straight-chain alkylene group that may have a substituent,
Z is a linking group that links $L^1$ and Ar, or alternatively, Z may not be present and $L^1$ and Ar may be linked directly to each other, and
Ar is represented by the following chemical formula (1a), (1b), or (1c).

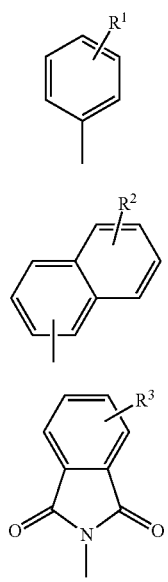

(1a)

(1b)

(1c)

15 Claims, 4 Drawing Sheets

(51) Int. Cl.

| | |
|---|---|
| C01B 32/174 | (2017.01) |
| C08G 65/04 | (2006.01) |
| C01B 32/05 | (2017.01) |
| B82Y 30/00 | (2011.01) |
| C01B 33/141 | (2006.01) |
| C08G 65/08 | (2006.01) |
| C09B 67/20 | (2006.01) |
| D04H 1/4218 | (2012.01) |
| D21H 17/53 | (2006.01) |
| D21H 21/08 | (2006.01) |

(52) U.S. Cl.
CPC ........ *C01B 32/174* (2017.08); *C01B 33/1417* (2013.01); *C08G 65/04* (2013.01); *C08G 65/08* (2013.01); *C09B 67/0066* (2013.01); *D04H 1/4218* (2013.01); *D21H 17/53* (2013.01); *D21H 21/08* (2013.01)

(56) References Cited

U.S. PATENT DOCUMENTS

| | | |
|---|---|---|
| 2005/0261457 A1 | 11/2005 | Falk et al. |
| 2006/0058429 A1 | 3/2006 | Poellmann et al. |
| 2008/0213568 A1 | 9/2008 | Johannsen et al. |
| 2010/0029842 A1 | 2/2010 | Falk et al. |
| 2011/0257326 A1 | 10/2011 | Jaunky et al. |
| 2012/0037036 A1 | 2/2012 | Veit et al. |

FOREIGN PATENT DOCUMENTS

| | | |
|---|---|---|
| EP | 0 605 937 | 7/1994 |
| EP | 1 160 279 | 12/2001 |
| JP | 59-80320 | 5/1984 |
| JP | 2-150463 | 6/1990 |
| JP | 5-058702 | 3/1993 |
| JP | 5-148404 | 6/1993 |
| JP | 6-116893 | 4/1994 |
| JP | 9-221517 | 8/1997 |
| JP | 2001-354847 | 12/2001 |
| JP | 2003-226887 | 8/2003 |
| JP | 2003-292725 | 10/2003 |
| JP | 2005-281665 | 10/2005 |
| JP | 2005281665 A * | 10/2005 |
| JP | 2005-536621 | 12/2005 |
| JP | 2006-505661 | 2/2006 |
| JP | 2006-077039 | 3/2006 |
| JP | 2007-039623 | 2/2007 |
| JP | 2008-248412 | 10/2008 |
| JP | 2010-247099 | 11/2010 |
| JP | 2011-068988 | 4/2011 |
| JP | 2012-006005 | 1/2012 |
| JP | 2012-041341 | 3/2012 |
| JP | 2012-509946 | 4/2012 |
| JP | 2012-166154 | 9/2012 |
| JP | 2012-180518 | 9/2012 |
| JP | 2013-221088 | 10/2013 |
| WO | 2007/037469 | 4/2007 |
| WO | 2014/071038 | 5/2014 |

OTHER PUBLICATIONS

Office Action issued in the corresponding Korean Patent Application No. 10-2016-7031591 dated Jun. 20, 2017, 7 pages with a partial translation.
Office Action issued in the basic Japanese Patent Application No. 2014-182779 dated Dec. 2, 2014, 5 pages with a partial translation.
Office Action issued in the basic Japanese Patent Application No. 2014-182779 dated Mar. 17, 2015, 6 pages with a partial translation.
Extended European Search Report issued in corresponding European Patent Application No. 15839770.3, dated Nov. 8, 2017, 7 pages.
Explanation of the word "formation", Newly Revised Dictionary of Paper and Pulp, edited by Japan Technical Association of the Pulp and Paper Industry, 1972, pp. 126-127—partial translation.
Office Action issued in corresponding Chinese Patent Application No. 201580022861.2, dated Jan. 19, 2018, 18 pages with an English translation.
Office Action issued in corresponding Japanese Patent Application No. 2016-547390, dated May 21, 2018, 8 pages with a machine translation.

* cited by examiner

DISPERSANT, DISPERSION COMPOSITION, AND FIBROUS SHEET

TECHNICAL FIELD

The present invention relates to a dispersant, a dispersion composition, and a fiber sheet.

BACKGROUND ART

It is expected that nano-carbons, such as carbon nanofibers (CNFs), can be utilized in various technical fields relating to, e.g., composite materials, nanoelectronics, nanomechanics, electron sources, energy, chemical, and medical treatment, owing to their chemical properties, electrical properties, mechanical properties, thermal conductivity, structural properties, etc. In order to allow a nano-carbon to sufficiently exhibit its properties and to facilitate utilization thereof in the respective fields, there is a demand for a dispersion composition obtained by uniformly dispersing the nano-carbon in a solvent such as water.

However, nano-carbons have problems in that they aggregate easily, and in particular, they are not dispersed in hydrophilic solvents. To address these problems, various methods have been disclosed. For example, Patent Document 1 discloses a method that uses a nonionic surfactant containing a polyalkylene oxide having a hydrophobic group at one end. Patent Document 2 discloses a method that uses an anionic surfactant containing a polyethylene oxide having a hydrophobic group at one end and an anionic group at the other end. Patent Document 3 discloses a method that uses an amphoteric surfactant.

In addition, the use of a polymeric surfactant also has been proposed. For example, Patent Document 4 discloses the use of a denatured polyvinyl alcohol polymeric surfactant. Patent Document 5 discloses a polyacrylic ester-based polymeric surfactant with a polyethylene oxide chain on a side chain. Patent Document 6 discloses the use of a polymeric surfactant containing polyethyleneimine having an alkylene oxide added thereto.

CITATION LIST

Patent Document(s)

Patent Document 1: JP 1997-221517 A
Patent Document 2: JP 2012-006005 A
Patent Document 3: JP 2007-039623 A
Patent Document 4: JP 2008-248412 A
Patent Document 5: JP 2012-166154 A
Patent Document 6: JP 2013-221088 A

BRIEF SUMMARY OF THE INVENTION

Problems to be Solved by the Invention

However, the dispersing effect of the nonionic surfactant disclosed in Patent Document 1 is not sufficient. The ionic surfactants disclosed in Patent Documents 2 and 3 can achieve somewhat improved dispersing ability. However, the use of the ionic surfactants has a problem in that aggregation may be caused easily by the addition of other additives, the influence of pH, etc.

It is known that polymeric surfactants, such as those disclosed in Patent Documents 3 to 5, achieve higher dispersion stability than the above-described low molecular weight surfactants. However, the dispersing ability of the polymeric surfactants is not sufficient. Besides, the improvement in dispersion stability results in a large increase in viscosity, so that it is not possible to disperse CNFs at a high concentration.

As described above, the conventionally known additives as disclosed in Patent Documents 1 to 6 have problems in that they cannot allow CNFs to be dispersed at a high concentration, and that they cannot allow CNFs to be dispersed stably for a long time. Accordingly, they are not useful as dispersants.

With the foregoing in mind, it is an object of the present invention to provide a dispersant and a dispersion composition that exhibit high dispersing ability for nano-carbons such as, in particular, CNTs, as well as a fiber sheet using the dispersant.

Means for Solving Problem

In order to achieve the above object, the present invention provides a dispersant containing: a polyalkylene oxide having a structural unit of the following chemical formula (1):

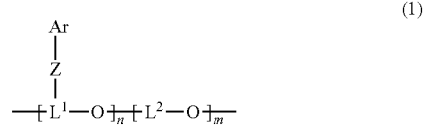
(1)

where in the chemical formula (1), $L^1$ is a straight-chain alkylene group in which at least one hydrogen atom is substituted with Z—Ar, and $L^1$ may or may not have a substituent other than Z—Ar, $L^2$ is a straight-chain alkylene group in which at least one hydrogen atom may or may not be substituted with a substituent, there may be one or more Z—Ar's, and when there are a plurality of Z—Ar's, they may be the same or different from each other, Z is a linking group that links $L^1$ and Ar, or alternatively, Z may not be present and $L^1$ and Ar may be linked directly to each other; and the linking group may or may not contain each of an alkylene chain, an ether bond, an ester bond, and an imide bond, Ar is represented by the following chemical formula (1a), (1b), or (1c); there may be one or more Ar's for one Z; when there are a plurality of Ar's, they may be the same or different from each other; and a naphthyl group in the following chemical formula (1b) may be either a 1-naphthyl group or a 2-naphthyl group,

(1a)

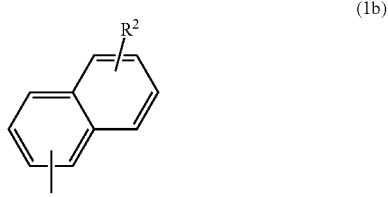
(1b)

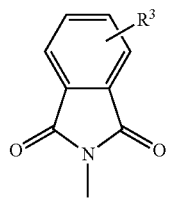

(1c)

$R^1$, $R^2$, and $R^3$ are each a substituent; there may be one or more of each of $R^1$, $R^2$, and $R^3$, or $R^1$, $R^2$, and $R^3$ each may not be present; and when there are a plurality of $R^1$s, $R^2$s, and $R^3$s, $R^1$s, $R^2$s, and $R^3$s may be the same or different from each other, respectively, n and m are each an integer of 1 or more, a sequence of $L^1$ and $L^2$ is not particularly limited, and may be any of alternating, random, or block sequences, and there may be one or more types of $L^1$s and $L^2$s, respectively.

The present invention also provides a dispersion composition containing: the dispersant according to the present invention; and a dispersoid.

The present invention also provides a fiber sheet obtained by subjecting a dispersion composition to a wet papermaking process. The dispersion composition contains: the dispersant according to the present invention; at least one of inorganic fibers or organic fibers; and a dispersion medium.

Effects of the Invention

The dispersant according to the present invention can exhibit high dispersing ability as a dispersant for nano-carbons such as CNFs. The dispersant according to the present invention is applicable not only to nano-carbons such as CNFs but also to, e.g., dispersoids such as various inorganic particles, organic particles, inorganic fibers, and organic fibers, and also can exhibit high dispersing ability for these dispersoids. The fiber sheet according to the present invention uses the dispersant according to the present invention. With this configuration, the fiber sheet according to the present invention has advantageous properties such as, for example, uniform fiber dispersion with little unevenness in density.

MODE FOR CARRYING OUT THE INVENTION

Figure 1:
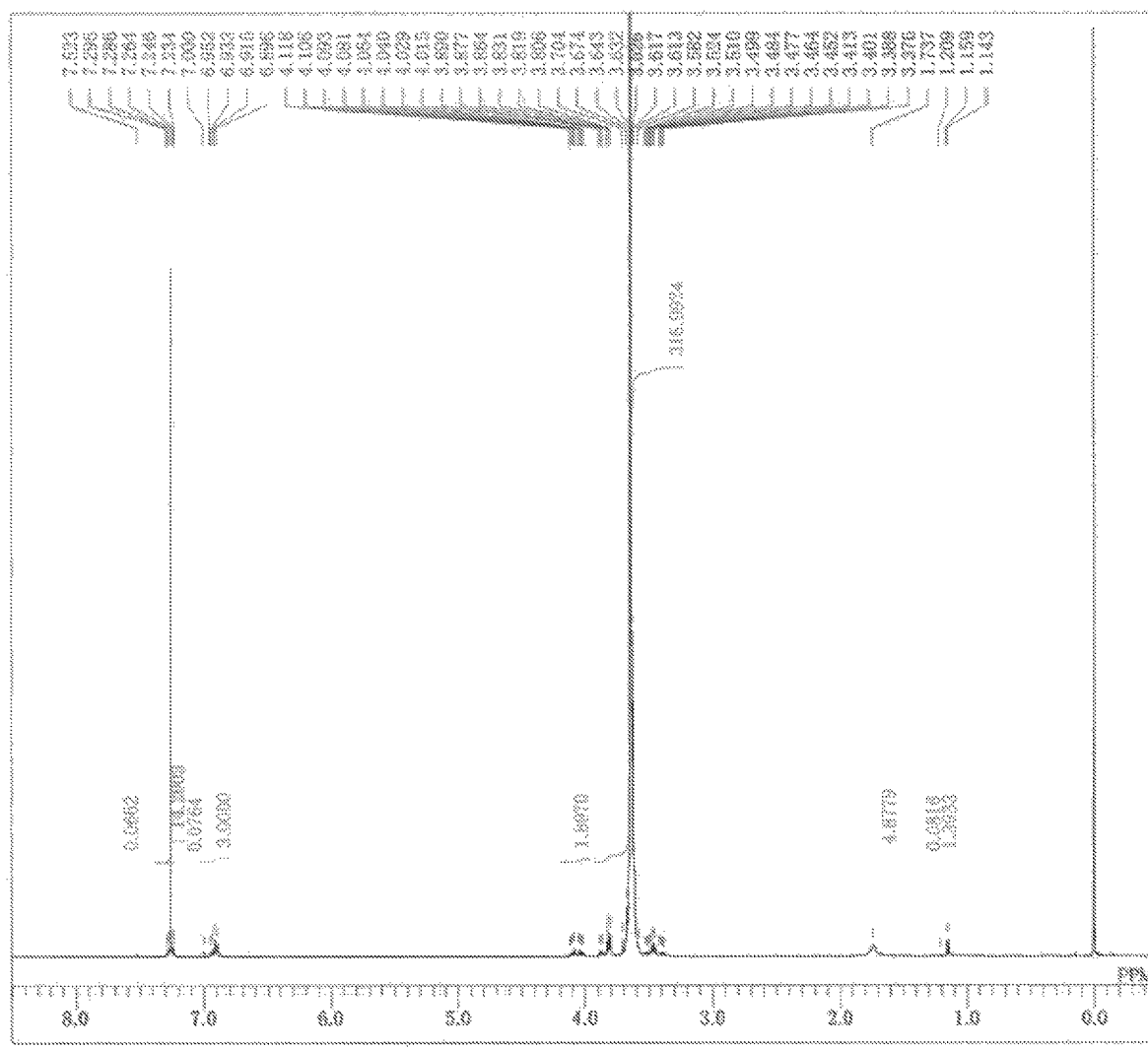
FIG. 1 shows the result of $^1$H-NMR measurement regarding a polyalkylene oxide (dispersant 1) obtained in Example 1-1.

The present invention will be described below with reference to illustrative examples. It is to be noted, however, that the present invention is by no means limited by the following description.

[I. Dispersant]

1. Polyalkylene Oxide

As described above, the dispersant of the present invention includes a polyalkylene oxide having a structural unit represented by the following chemical formula (1). $L^1$, $L^2$, Ar, Z, n, and m in the following chemical formula (1) are as described above.

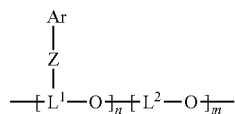

(1)

Although polyalkylene oxides having a hydrophobic group are already available, such polyalkylene oxides are straight-chain molecules and the hydrophobic group can be introduced only to their ends. Thus, the effects of these polyalkylene oxides as dispersants are very low. The inventors of the present invention synthesized polyalkylene oxide copolymers having hydrophobic groups (e.g., an alkyl group, an alkenyl group, and an aryl group) on side chains, and found out through diligent studies that the polyalkylene oxide copolymers with aryl groups on the side chains are effective as dispersants, in particular, as dispersants for nano-carbons such as CNFs. The inventors of the present invention conducted further studies on the basis of this finding. As a result, the inventors of the present invention found out that polyalkylene oxide copolymers having the structural unit of the chemical formula (1) are particularly effective, thus achieving the present invention.

The structures of the respective moieties in the structural unit of the chemical formula (1) will be described below with reference to illustrative examples.

<Structural Unit Composed of -$L^1$-O— and Z—Ar>

First, a structural unit composed of -$L^1$-O— and Z—Ar (also may be referred to as "structural subunit A" hereinafter) in the formula (1) will be described.

As described above, $L^1$ is a straight-chain alkylene group in which at least one hydrogen atom is substituted with Z—Ar. In $L^1$, the straight-chain alkylene is not particularly limited, and may be, for example, a methylene group [—$CH_2$—], an ethylene group [—$(CH_2)_2$—], an n-propylene group [—$(CH_2)_3$—], an n-butylene group [—$(CH_2)_4$—], a pentamethylene group [—$(CH_2)_5$—], a hexamethylene group [—$(CH_2)_6$—], a heptamethylene group [—$(CH_2)_7$—], an octamethylene group [—$(CH_2)_8$—], a nonamethylene group [—$(CH_2)_9$—], a decamethylene group [—$(CH_2)_{10}$—], or the like.

From the viewpoint of the reactivity of monomers as a raw material of the polyalkylene oxide represented by the chemical formula (1) (i.e., ease of synthesis of the polyalkylene oxide represented by the chemical formula (1)) or the availability of the monomers, the straight-chain alkylene group in $L^1$ preferably is a straight-chain alkylene with 1 to 4 carbon atoms, more preferably a straight-chain alkylene with 2 to 3 carbon atoms, and still more preferably a straight-chain alkylene with 2 carbon atoms.

In the chemical formula (1), Z is a linking group that links $L^1$ and Ar, or alternatively, Z may not be present and $L^1$ and Ar may be linked directly to each other, as described above. In Z, the linking group may or may not contain each of an alkylene chain, an ether bond, an ester bond, and an imide bond. The number of main chain atoms in the linking group is not particularly limited, and is, for example, 1 to 24. When the main chain is a polyether, the number of main chain atoms is, for example, 5 to 50. Specific examples of the linking group include the following chemical formulae (Z1) to (Z10). In the following chemical formulae (Z1) to (Z10), Ar indicates Ar in the chemical formula (1), and $L^1$ indicates $L^1$ in the chemical formula (1).

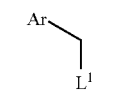 (Z1)

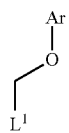 (Z2)

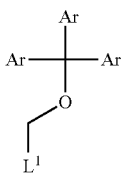 (Z3)

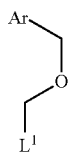 (Z4)

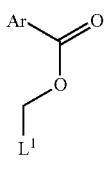 (Z5)

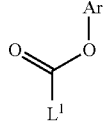 (Z6)

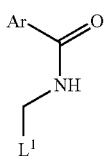 (Z7)

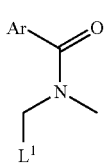 (Z8)

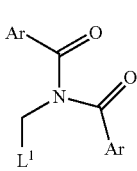 (Z9)

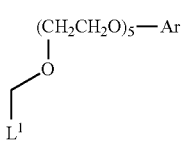 (Z10)

In the chemical formula (1), Ar is represented by the following chemical formula (1a), (1b), or (1c), and there may be one or more Ar's for one Z, as described above. The naphthyl group in the following chemical formula (1b) may be either a 1-naphthyl group or a 2-naphthyl group. Although the polyalkylene oxide similarly can exhibit the effect as a dispersant even when the Ar in the chemical formula (1) is any aromatic group other than the following chemical formulae (1a), (1b), and (1c), it is preferable that Ar is the following chemical formula (1a), (1b), or (1c). Furthermore, in $L^1$ in the chemical formula (1), the substituent other than Z—Ar may be a substituent containing any aromatic group, as will be described below.

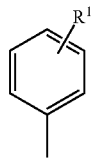 (1a)

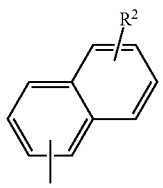 (1b)

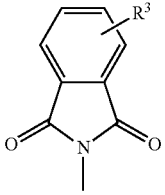 (1c)

$R^1$, $R^2$, and $R^3$ are each a substituent; there may be one or more of each of $R^1$, $R^2$, and $R^3$, or $R^1$, $R^2$, and $R^3$ each may not be present; and when there are a plurality of $R^1$s, $R^2$s, and $R^3$s, $R^1$s, $R^2$s, and $R^3$s may be the same or different from each other, respectively, as described above. $R^1$, $R^2$, and $R^3$ are not particularly limited, and each of $R^1$, $R^2$, and $R^3$ preferably is at least one substituent selected from the group consisting of alkyl groups, unsaturated aliphatic hydrocarbon groups, alkoxy groups, halogens, acyl groups, and haloalkyl groups.

In the present invention, the number of carbon atoms in each of the "substituents (all the substituents, including the substituent $R^1$, the substituent $R^2$, the substituent $R^3$, the substituent Z—Ar on $L^1$, the substituent other than Z—Ar on $L^1$, and the substituent on $L^2$)" is not particularly limited, and is, for example, 0 to 24. In the present invention, an "unsaturated aliphatic hydrocarbon group" contains one or more of at least one of double bond and triple bond, and examples of the unsaturated aliphatic hydrocarbon group include alkenyl groups and alkynyl groups. The same applies hereinafter. In the present invention, alkyl groups, unsaturated aliphatic hydrocarbon groups, alkoxy groups, haloalkyl groups, and acyl groups each may be a straight-chain group or a branched group. The same applies hereinafter. In the present invention, alkyl groups, alkoxy groups, haloalkyl groups, and acyl groups each preferably have 1 to 24 carbon atoms, and unsaturated aliphatic hydrocarbon groups preferably have 2 to 24 carbon atoms. The same applies hereinafter. In the present invention, the number of carbon atoms in an acyl group encompasses the number of carbonyl carbon atoms, unless otherwise stated. That is, an acyl group having one carbon atom refers to a formyl group. The term "aryl group" as used in the present invention may refer to, but not particularly limited to, an aryl group having 6 to 24 carbon atoms, for example. More specific examples of the aryl group will be given below. In the present invention, the term "aryl group" encompasses aryl groups with a substituent(s) (e.g., halogens and alkyl groups). The same applies to groups derived from aryl groups (e.g., aralkyl groups). The number of carbon atoms in an aryl group does not encompass the number of carbon atoms in the substituent(s). The term "heteroaryl group" as used in the present invention may refer to, but not particularly limited to, the above-described "aryl group" in which at least one carbon atom on the ring is substituted with a heteroatom (an atom other than carbon and hydrogen), for example. The term "aromatic group" (or "aromatic ring" or the like) as used in the present invention may refer to, but not particularly limited, the above-described "aryl group" or "heteroaryl group", for example. In the present invention, examples of the aromatic group include, but not particularly limited to, a phenyl group (C6), a 1-naphthyl group (C10), a 2-naphthyl group (C10), a phenalenyl group (C13), an anthryl group (C14), a phenanthryl group (C14), a pyrenyl group (C16), a naphthacenyl group (C18), a chrysenyl group (C18), a triphenylenyl group (C18), a perylenyl group (C20), a picenyl group (C22), a pentacenyl group (C22), a coronenyl group (C24), an indenyl group (C9), an azulenyl group (C10), a fluorenyl group (C13), a tetraphenylenyl group (C24), a biphenyl group (C12), a terphenyl group (C18), a quaterphenyl group (C24), a binaphthalenyl group (C20), a pentalenyl group (C8), a heptalenyl group (C12), a biphenylenyl group (C12), an indacenyl group (C12), an acenaphthylenyl group (C12), an aceanthrylenyl group (C16), a fluoranthenyl group (C16), o-, m-, and p-tolyl group (C7), a xylyl group (C8), a mesityl group (C9), o-, m-, and p-cumenyl group (C9), an anthraquinolyl group (C14), an imidazole group (C3), a pyrazole group (C3), an oxazole group (C3), a thiazole group (C3), a pyrazine group (C4), a thiazine group (C4), an indole group (C8), an isoindol group (C8), a phthalimido group (C8), a benzimidazole group (C7), a purine group (C5), a quinoline group (C9), an isoquinoline group (C9), a quinoxaline group (C8), a cinnoline group (C8), a pteridine group (C6), a chromene group (C9), an isochromene group (C9), an acridine group (C13), a xanthene group (C13), a carbazole group (C12), and a benzocinnoline group (C12). The numerical value placed immediately after the letter "C" in parentheses indicates the number of carbon atoms of the aromatic ring. In the present invention, when a "substituent" has isomers, the substituent may be any isomer, unless otherwise stated. For example, a "propyl group" may be either a 1-propyl group or a 2-propyl group.

As described above, there may be one or more Z—Ar's in the chemical formula (1), and when there are a plurality of Z—Ar's, they may be the same or different from each other.

For example, when the straight-chain alkylene group in $L^1$ is an ethylene group, any one to four hydrogen atoms in the ethylene group may be substituted with Z—Ar, and when there are a plurality of Z—Ar's, they may be the same or different from each other.

As described above, $L^1$ may or may not have a substituent other than Z—Ar. When $L^1$ has a substituent other than Z—Ar, there may be one or more substituents other than Z—Ar for one $L^1$. When there are a plurality of substituents other than Z—Ar, they may be the same or different from each other. The substituent other than Z—Ar is not particularly limited, and may be the same as a substituent on $L^2$ to be described below. The substituent other than Z—Ar may contain an aromatic group (an aryl group, a heteroaryl group, or the like), for example.

Specific examples of the structure of the structural subunit A are represented by the following chemical formulae (1-1) to (1-15) and (2). From the viewpoint of dispersing ability, the structure of the structural subunit A preferably is at least one of the chemical formulae (1-1) to (1-11) and (2), more preferably at least one of the chemical formulae (1-1), (1-3), (1-4), (1-6), (1-7), (1-8), and (2), and particularly preferably at least one of the chemical formulae (1-6) and (2). The chemical formulae (1-6) and (2) show the structures used in Examples to be described below. The chemical formulae (1-1) to (1-5), (1-7), and (1-12) to (1-14) show the structures that are similar to the structure of the chemical formula (1-6) in that the aromatic ring(s) does not contain any heteroatom and the side chain does not contain any heteroatom other than an ether bond. The chemical formulae (1-8) to (1-12) show the structures that are similar to the following chemical formula (2) in that the aromatic ring(s) or the chain binding the main chain and the aromatic ring(s) contains an amide bond, an imide bond, or an ester bond.

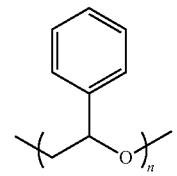

(1-1)

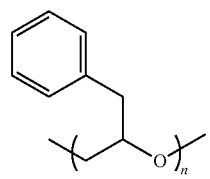

(1-2)

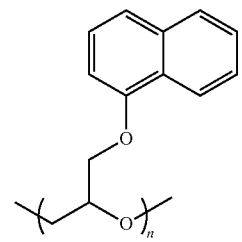

(1-3)

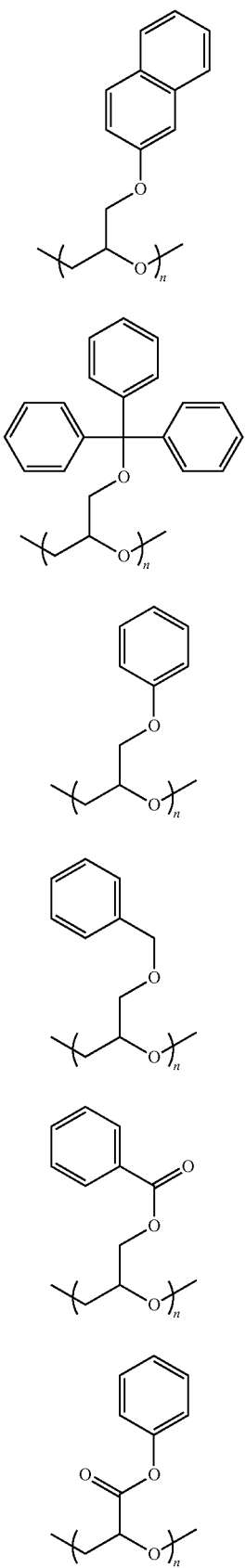
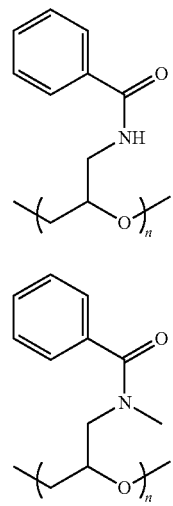

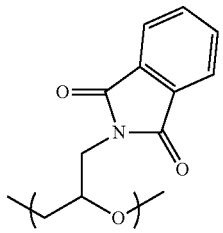

(2)

<Structural Unit Composed of -L²-O—>

Next, a structural unit composed of -L²-O— in the chemical formula (1) (also may be referred to as "structural subunit B" hereinafter) will be described.

As described above, $L^2$ is a straight-chain alkylene group. The straight-chain alkylene is not particularly limited, and examples thereof include a methylene group [—$CH_2$—], an ethylene group [—$(CH_2)_2$—], an n-propylene group [—$(CH_2)_3$—], an n-butylene group [—$(CH_2)_4$—], a pentamethylene group [—$(CH_2)_5$—], a hexamethylene group [—$(CH_2)_6$—], a heptamethylene group [—$(CH_2)_7$—], an octamethylene group [—$(CH_2)_8$—], a nonamethylene [—$(CH_2)_9$—], and a decamethylene group [—$(CH_2)_{10}$—].

From the viewpoint of high hydrophilicity of the structural subunit B, the reactivity of monomers as a raw material of the polyalkylene oxide represented by the chemical formula (1) (i.e., ease of synthesis of the polyalkylene oxide represented by the chemical formula (1)), or the availability of the monomers, $L^2$ preferably is a straight-chain alkylene with 1 to 4 carbon atoms, more preferably a straight-chain alkylene with 2 to 3 carbon atoms, and still more preferably a straight-chain alkylene with 2 carbon atoms.

$L^2$ may or may not have a substituent, as described above. When $L^2$ has a substituent, there may be one or more substituents for one $L^2$. It is preferable that $L^2$ has one substituent. When $L^2$ has a plurality of substituents, they may be the same or different from each other. The substituent in $L^2$ is not particularly limited, and preferably is at least one selected from the group consisting of alkyl groups, unsaturated aliphatic hydrocarbon groups, haloalkyl groups, alkoxy groups, acyl groups, acyloxy groups, alkoxycarbonyl groups, alkenyloxycarbonyl groups, alkoxyalkyl groups, alkenyloxyalkyl groups, alkynyloxyalkyl groups, haloalkoxyalkyl groups, alkoxy-poly(alkyloxy)alkyl groups, acyloxyalkyl groups, halogens, (meth)acryloyloxyalkyl groups, and (meth)acryloyloxyalkoxyalkyl groups. The term "(meth)acrylic acid" as used in the present invention means at least one of an acrylic acid and a methacrylic acid. The same applies to structures derived from the (meth)acrylic acid (e.g., a (meth)acryloyl group).

The alkyl groups are not particularly limited, and examples thereof include straight-chain and branched alkyl groups having 1 to 10 carbon atoms, such as a methyl group, an ethyl group, a propyl group, a butyl group, a pentyl group, a hexyl group, a heptyl group, an octyl group, a nonyl group, and a decyl group.

The unsaturated aliphatic hydrocarbon groups are not particularly limited, and examples thereof include; alkenyl groups having 2 to 10 carbon atoms, such as a vinyl group, an allyl group, a propenyl group, a butyryl group, a pentyryl group, a hexryl group, a heptyryl group, an octyryl group, a nonyryl group, and a decyryl group; and straight-chain and branched alkynyl groups having 2 to 10 carbon atoms, such as an ethynyl group and a propargyl group.

In the haloalkyl groups, the number of substituted halogens may be one or more. The haloalkyl groups are not particularly limited, and examples thereof include straight-chain and branched haloalkyl groups having 2 to 21 carbon atoms, such as a chloromethyl group, a chloroethyl group, a chlorobutyl group, a dichloromethyl group, a trifluoromethyl group, a bromomethyl group, a bromoethyl group, a fluoromethyl group, and a trifluoroethyl group.

The alkoxy groups are not particularly limited, and examples thereof include straight-chain and branched alkoxy groups having 1 to 20 carbon atoms, such as a methoxy group, an ethoxy group, an n-propoxy group, an i-propoxy group, an n-butoxy group, a 2-methylpropoxy group, a 1-methylpropoxy group, and a t-butoxy group.

The acyl groups are not particularly limited, and examples thereof include straight-chain and branched acyl groups having 2 to 21 carbon atoms, such as a formyl group, an acetyl group, an ethylcarbonyl group, a propylcarbonyl group, a pentylcarbonyl group, a cyclohexylcarbonyl group, an octylcarbonyl group, a 2-ethylhexylcarbonyl group, and a dodecylcarbonyl group.

The acyloxy groups are not particularly limited, and examples thereof include a formyloxy group, an acetyloxy group, a pivaloyloxy group, and a stearoyloxy group.

The alkoxycarbonyl groups are not particularly limited, and examples thereof include a methoxycarbonyl group, an ethoxycarbonyl group, a tert-butoxycarbonyl group, and an n-octadecyloxycarbonyl group.

Examples of the alkenyloxycarbonyl groups include a vinyloxycarbonyl group and an allyloxycarbonyl group.

The alkoxyalkyl groups are not particularly limited, and examples thereof include alkoxymethyl groups. More specifically, examples of the alkoxyalkyl groups include straight-chain and branched alkoxymethyl groups having 2 to 21 carbon atoms, such as a methoxymethyl group, an ethoxymethyl group, a propoxymethyl group, a butoxymethyl group, a pentyloxymethyl group, a hexyloxymethyl group, a heptyloxymethyl group, an octyloxymethyl group, a decyloxymethyl group, a dodecyloxymethyl group (lauryloxymethyl group), a hexadecyloxymethyl group (cetyloxymethyl group), an octadecyloxymethyl group (stearyloxymethyl group), an icosyloxymethyl group, and a hexadecyloxymethyl group.

The alkenyloxyalkyl groups are not particularly limited, and examples thereof include alkenyloxymethyl groups. More specifically, examples of the alkenyloxyalkyl groups include straight-chain and branched alkenyloxyalkyl group having 2 to 21 carbon atoms, such as a vinyloxymethyl group, an allyloxymethyl group, an isopropenyloxymethyl group, and an oleyloxymethyl group.

The alkynyloxyalkyl groups are not particularly limited, and examples thereof include straight-chain and branched alkynyloxyalkyl groups having 2 to 21 carbon atoms, such as an alkynyloxymethyl group.

The haloalkoxyalkyl groups are not particularly limited, and examples thereof include haloalkoxymethyl groups. More specifically, examples of the haloalkoxyalkyl groups include straight-chain and branched haloalkoxymethyl groups having 2 to 21 carbon atoms, such as a chloromethoxymethyl group, a chloroethoxymethyl group, a chlorobutoxymethyl group, a dichloromethoxymethyl group, a trifluoromethoxymethyl group, a bromomethoxymethyl group, a fluoromethoxymethyl group, a trifluoroethoxymethyl group, a tetrafluoropropoxymethyl group, an octafluoropentyloxymethyl group, and a dodecafluoroheptyloxymethyl group.

The alkoxy-poly(alkyloxy)alkyl groups are not particularly limited, and examples thereof include alkoxy-poly(alkyloxy)methyl groups. More specifically, examples of the alkoxy-poly(alkyloxy)alkyl groups include a dodecyloxy-$(CH_2CH_2O)_{15}$-methyl group.

The halogens are not particularly limited, and examples thereof include a fluorine atom, a chlorine atom, and a bromine atom.

The (meth)acryloyloxyalkyl groups are not particularly limited, and examples thereof include (meth)acryloyloxymethyl groups. More specifically, examples of the (meth)acryloyloxyalkyl groups include straight-chain and branched (meth)acryloyloxyalkyl groups having 2 to 21 carbon atoms, such as an acryloyloxymethyl group and a methacryloyloxymethyl group.

The (meth)acryloyloxyalkoxyalkyl groups are not particularly limited, and examples thereof include (meth)acryloyloxyalkoxymethyl groups. More specifically, examples of the (meth)acryloyloxyalkoxyalkyl groups include straight-chain and branched (meth)acryloyloxyalkoxyalkyl groups having 2 to 21 carbon atoms, such as an acryloyloxybutoxymethyl group.

It is more preferable that the substituent on $L^2$ is at least one substituent selected from the group consisting of alkyl groups, alkenyl groups, alkynyl groups, haloalkyl groups, alkoxy groups, acyl groups, acyloxy groups, alkoxycarbonyl groups, alkenyloxycarbonyl groups, alkoxymethyl groups, alkenyloxymethyl groups, haloalkoxymethyl groups, alkoxy-poly(alkyloxy)methyl groups, acyloxymethyl groups, halogens, (meth)acryloyloxymethyl groups, and (meth)acryloyloxyalkoxymethyl groups. Also, in the chemical formula (1), one hydrogen atom in $L^2$ may or may not be substituted with a substituent (that is, the number of substituents is 1 or 0), and it is still more preferable that the substituent is at least one substituent selected from the group consisting of a methyl group, an ethyl group, a propyl group, a butyl group, a pentyl group, a hexyl group, a heptyl group, an octyl group, a nonyl group, a decyl group, a vinyl group, an allyl group, a propenyl group, a butyryl group, a pentyryl group, a hexryl group, a heptyryl group, an octyryl group, a nonyryl group, a decyryl group, an ethynyl group, a propargyl group, a methoxy group, an ethoxy group, an n-propoxy group, an i-propoxy group, an n-butoxy group, a 2-methylpropoxy group, a 1-methylpropoxy group, a t-butoxy group, a chloromethyl group, a perfluorobutylmethyl group, a perfluorohexylmethyl group, a chloroethyl group, a chlorobutyl group, a dichloromethyl group, a trifluoromethyl group, a bromomethyl group, a bromoethyl group, a fluoromethyl group, a trifluoroethyl group, a methoxycarbonyl group, an ethoxycarbonyl group, a butoxycarbonyl group, a methoxymethyl group, an ethoxymethyl group, a propoxymethyl group, a butoxymethyl group, a pentyloxymethyl group, a hexyloxymethyl group, a heptyloxymethyl group, an octyloxymethyl group, an icosyloxymethyl group, a decyloxymethyl group, a dodecyloxymethyl group, a hexadecyloxymethyl group, an octadecyloxymethyl group, an allyloxymethyl group, a vinyloxymethyl group, an isopropenyloxymethyl group, an oleyloxymethyl group, a dodecyloxy-$(CH_2CH_2O)_{15}$-methyl group, an acryloyloxybutoxymethyl group, a tetrafluoropropoxymethyl group, an octafluoropentyloxymethyl group, a dodecafluoroheptyloxymethyl group, an acryloyloxymethyl group, a methacryloyloxymethyl group, a fluorine atom, a chlorine atom, a bromine atom, a formyl group, an acetyl group, an ethylcarbonyl group, a propylcarbonyl group, a pentylcarbonyl group, a cyclohexylcarbonyl group, an octylcarbonyl group, a 2-ethylhexylcarbonyl group, and a dodecylcarbonyl group.

The mechanism by which the polyalkylene oxide copolymer represented by the chemical formula (1) serves as a dispersant is, for example, as described below on the basis of presumption or by way of example. The structural subunit A includes a substituent Ar having an aromatic ring(s). Thus, the structural subunit A adsorbs onto the surface of a dispersoid, owing to the specific affinity of the aromatic ring(s). On the other hand, the structural subunit B does not include an aromatic ring, and thus is less prone to adsorb onto the surface of a dispersoid. Besides, the structural subunit B has affinity for a dispersion medium. With this configuration, the polyalkylene oxide copolymer represented by the chemical formula (1) exhibits a surfactant effect. For example, when the structural subunit B is hydrophilic, a dispersoid having a high affinity for the aromatic ring can be dispersed in water. It is to be noted, however, that this mechanism is described on the basis of presumption or by way of example only as described above, and the present invention is by no means limited by this mechanism. The dispersion medium applicable to the dispersant according to the present invention is not limited to water, and any dispersion medium can be used, as will be described below.

Specific examples of the structure of the structural subunit B are represented by the following chemical formulae (3-1) and (3-2).

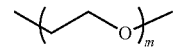
(3-1)

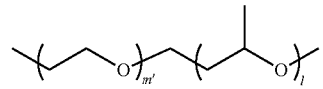
(3-2)

In the chemical formulae (3-1) and (3-2), m, m', and l are each an integer of 1 or more.

When the polyalkylene oxide represented by the chemical formula (1) has isomers such as tautomers and stereoisomer (e.g.: a geometric isomer, a conformer, and an optical isomer), any isomer can be used in the present invention.

The structural subunits A and B in the polyoxyalkylene oxide having the structural unit of the chemical formula (1) have been described above, respectively. In the polyoxyalkylene having the structural unit of the chemical formula (1) in the present invention, the chemical formulae given above as specific examples of the structural subunit A and the structural subunit B may be used in any combination, for example. Regarding the structural unit of the chemical formula (1), Table 1 below shows specific examples of the combination of the structural subunits A and B (structural units 1 to 32).

TABLE 1

| Chemical formula (1) | Structural subunit A | Structural subunit B |
| --- | --- | --- |
| Structural unit 1 | Chemical formula (1-1) | Chemical formula (3-1) |
| Structural unit 2 | Chemical formula (1-2) | Chemical formula (3-1) |
| Structural unit 3 | Chemical formula (1-3) | Chemical formula (3-1) |
| Structural unit 4 | Chemical formula (1-4) | Chemical formula (3-1) |
| Structural unit 5 | Chemical formula (1-5) | Chemical formula (3-1) |
| Structural unit 6 | Chemical formula (1-6) | Chemical formula (3-1) |
| Structural unit 7 | Chemical formula (1-7) | Chemical formula (3-1) |
| Structural unit 8 | Chemical formula (1-8) | Chemical formula (3-1) |
| Structural unit 9 | Chemical formula (1-9) | Chemical formula (3-1) |
| Structural unit 10 | Chemical formula (1-10) | Chemical formula (3-1) |

TABLE 1-continued

| Chemical formula (1) | Structural subunit A | Structural subunit B |
|---|---|---|
| Structural unit 11 | Chemical formula (1-11) | Chemical formula (3-1) |
| Structural unit 12 | Chemical formula (1-12) | Chemical formula (3-1) |
| Structural unit 13 | Chemical formula (1-13) | Chemical formula (3-1) |
| Structural unit 14 | Chemical formula (1-14) | Chemical formula (3-1) |
| Structural unit 15 | Chemical formula (1-15) | Chemical formula (3-1) |
| Structural unit 16 | Chemical formula (2) | Chemical formula (3-1) |
| Structural unit 17 | Chemical formula (1-1) | Chemical formula (3-2) |
| Structural unit 18 | Chemical formula (1-2) | Chemical formula (3-2) |
| Structural unit 19 | Chemical formula (1-3) | Chemical formula (3-2) |
| Structural unit 20 | Chemical formula (1-4) | Chemical formula (3-2) |
| Structural unit 21 | Chemical formula (1-5) | Chemical formula (3-2) |
| Structural unit 22 | Chemical formula (1-6) | Chemical formula (3-2) |
| Structural unit 23 | Chemical formula (1-7) | Chemical formula (3-2) |
| Structural unit 24 | Chemical formula (1-8) | Chemical formula (3-2) |
| Structural unit 25 | Chemical formula (1-9) | Chemical formula (3-2) |
| Structural unit 26 | Chemical formula (1-10) | Chemical formula (3-2) |
| Structural unit 27 | Chemical formula (1-11) | Chemical formula (3-2) |
| Structural unit 28 | Chemical formula (1-12) | Chemical formula (3-2) |
| Structural unit 29 | Chemical formula (1-13) | Chemical formula (3-2) |
| Structural unit 30 | Chemical formula (1-14) | Chemical formula (3-2) |
| Structural unit 31 | Chemical formula (1-15) | Chemical formula (3-2) |
| Structural unit 32 | Chemical formula (2) | Chemical formula (3-2) |

The structural unit in the polyalkylene oxide having the structural unit of the chemical formula (1) may be any of the following structural units (A1) to (A27), for example. It is to be noted that the sequence of the respective monomer structural units in the following structural unit (A1) to (A27) is not particularly limited, and may be any of alternating, random, or block sequences. In the following description, an alkyl group having 1 to 18 alkyl carbon atoms may be a dodecyl group, for example.

(A1) a copolymer of an ethylene oxide and a styrene oxide
(A2) a copolymer of a propylene oxide and a styrene oxide
(A3) a copolymer of an ethylene oxide, a propylene oxide and a styrene oxide
(A4) a copolymer of an ethylene oxide, a butylene oxide, and a styrene oxide
(A5) a copolymer of an ethylene oxide, an alkyl glycidyl ether having 1 to 18 alkyl carbon atoms, and a styrene oxide
(A6) a copolymer of an ethylene oxide, an allyl glycidyl ether, and a styrene oxide
(A7) a copolymer of an ethylene oxide and a phenyl glycidyl ether
(A8) a copolymer of a propylene oxide and a phenyl glycidyl ether
(A9) a copolymer of an ethylene oxide, a propylene oxide, and a phenyl glycidyl ether
(A10) a copolymer of an ethylene oxide, a butylene oxide, and a phenyl glycidyl ether
(A11) a copolymer of an ethylene oxide, an alkyl glycidyl ether having 1 to 18 alkyl carbon atoms, and a phenyl glycidyl ether
(A12) a copolymer of an ethylene oxide, an allyl glycidyl ether, and a phenyl glycidyl ether
(A13) a copolymer of an ethylene oxide and a naphthyl glycidyl ether
(A14) a copolymer of a propylene oxide and a naphthyl glycidyl ether
(A15) a copolymer of an ethylene oxide, a propylene oxide, and a naphthyl glycidyl ether
(A16) a copolymer of an ethylene oxide, a butylene oxide, and a naphthyl glycidyl ether
(A17) a copolymer of an ethylene oxide, an alkyl glycidyl ether having 1 to 18 alkyl carbon atoms, and a naphthyl glycidyl ether
(A18) a copolymer of an ethylene oxide, an allyl glycidyl ether, and a naphthyl glycidyl ether
(A19) a copolymer of an ethylene oxide and an N-glycidylphthalimide
(A20) a copolymer of a propylene oxide and an N-glycidylphthalimide
(A21) a copolymer of an ethylene oxide, a propylene oxide, and an N-glycidylphthalimide
(A22) a copolymer of an ethylene oxide, a butylene oxide, and an N-glycidylphthalimide
(A23) a copolymer of an ethylene oxide, an alkyl glycidyl ether having 1 to 18 alkyl carbon atoms, and an N-glycidylphthalimide
(A24) a copolymer of an ethylene oxide, an allyl glycidyl ether, and an N-glycidylphthalimide
(A25) a copolymer of an ethylene oxide, a styrene oxide, and an N-glycidylphthalimide
(A26) a copolymer of an ethylene oxide, a phenyl glycidyl ether, and an N-glycidylphthalimide
(A27) a copolymer of an ethylene oxide, a naphthyl glycidyl ether, and an N-glycidylphthalimide In the dispersant of the present invention, from the viewpoint of dispersing ability, the structural unit in the polyalkylene oxide having the structural unit of the chemical formula (1) preferably is: any one selected from the structural units 1 to 32 in Table 1 and the structural units (A1) to (A27); more preferably the structural unit 6, 16, 22, or 32 in Table 1; and particularly preferably the structural unit 22 in Table 1 (the structural unit 22 is the same as the structural unit [A7] and the following chemical formula [4]) or the structural unit 16 in Table 1 (the structural unit 16 is the same as the structural unit [A19] and the following chemical formula [5]).

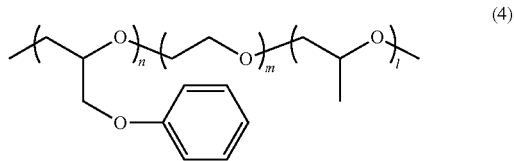

(4)

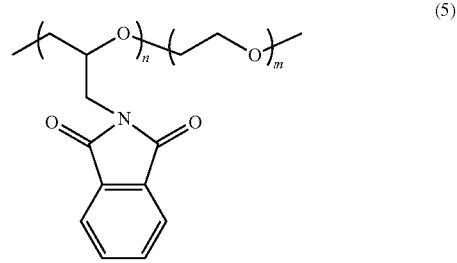

(5)

In the chemical formula (4), n, m, and l are each an integer of 1 or more. In the chemical formula (5), n and m are each an integer of 1 or more.

In the chemical formula (1), n is the number of the structural subunits A, and n is an integer of 1 or more. In the chemical formula (1), m is the number of the structural subunits B, and m is an integer of 1 or more. The sequence of the structural subunits A and B is not particularly limited, and the polyalkylene oxide having the structural unit of the chemical formula (1) may be an alternating copolymer, a random copolymer, or a block copolymer. The polyalkylene oxide preferably is a random copolymer, from the viewpoint of dispersing ability. There may be one or more types of each of the structural subunits A and B.

(Copolymerization Ratio)

The copolymerization ratio between the structural subunits A and B (the structural subunit A: the structural subunit B) in the polyalkylene oxide having the structural unit of the chemical formula (1) is not particularly limited. From the viewpoint of dispersing ability, the copolymerization ratio (the structural subunit A: the structural subunit B) is, for example, 0.01:99.99 to 50:50, preferably 0.1:99.9 to 30:70, more preferably 0.5:99.5 to 20:90, and still more preferably 1:99 to 10:90. It is to be noted, however, that these numerical values are merely illustrative, and may be changed as appropriate according to the intended use etc. For example, the copolymerization ratio (the structural subunit A:the structural subunit B) may be changed according to the polarity of a dispersion medium (e.g., when the dispersion medium is water, when the dispersion medium is a dispersion medium other than water, or when the dispersion medium is a mixture of water and a dispersion medium other than water). More specifically, for example, when the dispersion medium has low polarity (high hydrophobicity), the copolymerization ratio (the structural subunit A:the structural subunit B) may be adapted so that the structural subunit A is present at a higher ratio than the structural subunit B.

(Weight-Average Molecular Weight)

In the dispersant of the present invention, the weight-average molecular weight of the polyalkylene oxide having the structural unit of the chemical formula (1) is not particularly limited. From the viewpoint of dispersing ability, it is preferable that the weight-average molecular weight is large. The weight-average molecular weight is, for example, 1,000 or more, preferably 4,000 or more, more preferably 5,000 or more, still more preferably 10,000 or more, still more preferably 20,000 or more, and still more preferably 30,000 or more. On the other hand, from the viewpoint of lowering the viscosity to improve the handleability, it is preferable that the weight-average molecular weight is small. The weight-average molecular weight is, for example 10,000,000 or less, preferably 1,000,000 or less, more preferably 500,000 or less, and still more preferably 200,000 or less. The method for measuring the weight-average molecular weight is not particularly limited, and examples thereof include measurement methods described in Examples to be described below.

(Terminal Structures)

The polyalkylene oxide having the structural unit of the chemical formula (1) is a polyalkylene oxide whose main structure is represented by the chemical formula (1). In the polyalkylene oxide having the structural unit of the chemical formula (1), each terminal structure not shown in the chemical formula (1) is composed of a polymerization initiator, a polymerization terminator, a catalyst, or the like used for the synthesis of the polyalkylene oxide having the structural unit of the chemical formula (1), and is not particularly limited.

The terminal structure generally is composed of a structure derived from a polymerization initiator, a polymerization terminator, or a catalyst added to the main structure, although the terminal structure may vary depending on, for example, the method for synthesizing the polyalkylene oxide having the structural unit of the chemical formula (1).

Examples of the polymerization initiator include compounds, acids, organic salts, metal salts, onium salts, peroxides, and disulfide compounds having an active hydrogen atom(s) in their molecular structures. The terminal structure derived from the polymerization initiator is, for example, a structure in which an active hydrogen atom(s) or a cation structure(s) in the above-described compound is substituted or a structure to which a radical generating part has been added.

The number of active hydrogen atoms, acid groups, or the like in the polymerization initiator is not particularly limited, and preferably is 4 or less, more preferably 2 or less, and still more preferably 1. The terminal structure at one end of the polyalkylene oxide having the structural unit of the chemical formula (1) is, for example, a hydrogen atom, an alkyl group, an aryl group, a hydroxy group, or a substituted or unsubstituted terminal structure having, as a linking group, an amino group, an amido group, an imido group, an ether group, a thioether group, an ester group, a mineral acid residue, an activated carbon residue, or the like.

In the structural unit of the chemical formula (1), the terminal structure at the other end is not particularly limited. The terminal structure at the other end generally is composed of a structure derived from a polymerization terminator or a catalyst added to the main structure, for example. More specifically, the terminal structure at the other end is, for example, composed of the whole or part of the structure of the polymerization terminator or the catalyst bound to an oxygen atom at the end, generated when the alkylene oxide structure is ring-opened by the polymerization reaction.

Examples of the terminal structure derived from the polymerization terminator or the catalyst include: hydroxy groups; substituted or unsubstituted structures having, as a linking group, an amino group, an amido group, an imido group, an ether group, a thioether group, or an ester group; substituted carboxyl groups, mineral acid ester groups, mineral acid residues, and activated carbon residues; alkali metal salts; onium salts of heteroatoms such as substituted amino groups; and alkyl metal salts.

In the structural unit of the chemical formula (1), the terminal structures at both the ends may be the same or different from each other. The substituent in the terminal structure preferably is an alkyl group or aryl group having 20 or less carbon atoms, more preferably an alkyl group or aryl group having 6 or less carbon atoms. The mineral acid residue preferably is a halogen atom, a sulfuric ester group, a phosphoric ester group, or the like, more preferably a chlorine atom, a bromine atom, or the like.

The polyalkylene oxide whose main structure is represented by the chemical formula (1) is, for example, a polyalkylene oxide in which the structure represented by the chemical formula (1) makes up at least 90% of the molecular weight, preferably at least 95% of the molecular weight, more preferably at least 98% of the molecular weight, and still more preferably at least 99.5% of the molecular weight of the polyalkylene oxide.

2. Additives

The dispersant of the present invention may be used in combination with an additive(s), when necessary. For example, any substance that is used as a dispersant and is other than the substance represented by the chemical formula (1) may be used in combination as the additive. The dispersant that can be used in combination is not particularly limited, and examples thereof include known surfactants such as nonionic surfactants, anionic surfactants, cationic surfactants, and amphoteric surfactants.

[Method for Producing Polyalkylene Oxide]

The method for producing the polyalkylene oxide having the structural unit of the chemical formula (1) as a component of the dispersant according to the present invention is not particularly limited. The polyalkylene oxide having the structural unit of the chemical formula (1) can be produced by, for example, copolymerizing the monomer(s) of the structural subunit A and the monomer(s) of the structural subunit B by a known method or a method equivalent thereto. There may be one or more types of the monomers of each of the structural subunits A and B. The monomers may be, for example, cyclic ethers corresponding to the number of carbon atoms in the alkylene groups on $L^1$ and $L^2$, respectively. Scheme 1 below shows an example of the formula representing the chemical reaction. Scheme 1 illustrates an example where $L^1$ and $L^2$ are each an ethylene group (an alkylene group having 2 carbon atoms). In Scheme 1, n and m are each an integer of 1 or more.

Scheme 1

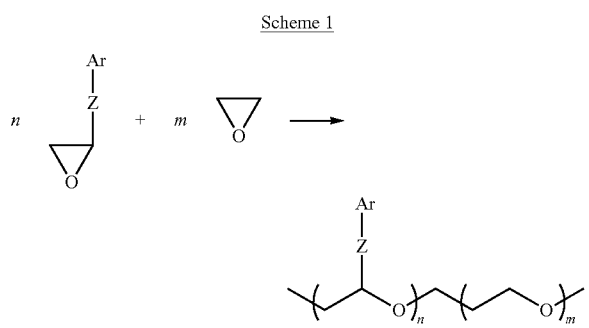

Scheme 2 below illustrates an example where there are two or more types of the monomers (ethylene oxide and propylene oxide) of the structural subunit B. In Scheme 2, n, m', and l are each an integer of 1 or more.

Scheme 2

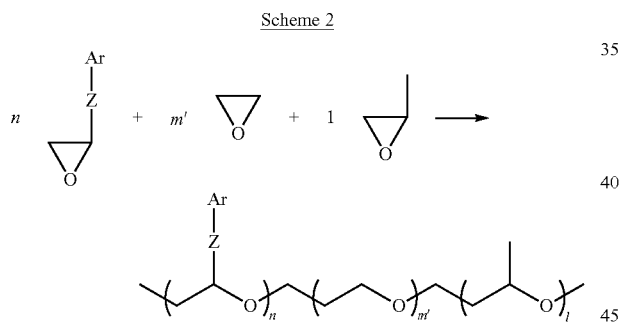

In the above reaction formula (Scheme 1), the polymerization ratio (n:m) between the monomer component of the structural subunit A and the monomer component of the structural subunit B is not particularly limited. In the case where the dispersant of the present invention is a dispersant for water (a dispersant to be used when a dispersion medium is water), the polymerization ratio is, for example, n:m=0.01:99.99 to 50:50, preferably 0.1:99.9 to 30:70, more preferably 0.5:99.5 to 20:90, and still more preferably 1:99 to 10:90, from the viewpoint of dispersing ability. It is to be noted here that these numerical values are merely illustrative, and may be changed as appropriate according to the intended use (e.g., the type of the dispersion medium) etc., as described above.

In the reaction formula (Scheme 2), the polymerization ratio (n:m':l) between the monomer component of the structural subunit A and the monomer components of the structural subunit B is not particularly limited. In the case where the dispersant of the present invention is a dispersant for water (a dispersant to be used when a dispersion medium is water), assuming that n+m'+l=100%, the polymerization ratio (n:m':l) is such that, for example, m'=10% to 99.99%, preferably m'=20% to 99.9%, more preferably m'=50% to 99%, and still more preferably m'=70% to 95%, from the viewpoint of dispersing ability. On the other hand, in the case where the dispersant of the present invention is a dispersant for solvents (a dispersant to be used when a dispersion medium is a hydrophobic solvent), the polymerization ratio (n:m':l) is such that, for example, l=10% to 99.99%, preferably, l=20% to 99.9%, more preferably l=50% to 99%, and still more preferably l=70% to 95%. Similarly to the above-described case, these numerical values also may be changed as appropriate according to the intended use (e.g., the type of the dispersion medium) etc.

The structures of the monomers of the structural subunits A and B may be selected as appropriate according to the structures of the structural subunits A and B. For example, when $L^1$ has a substituent other than Z—Ar, a cyclic ether having a corresponding substituent may be used as the monomer of the structural subunit A. Similarly, when $L^2$ has a substituent, a cyclic ether having a corresponding substituent may be used as the monomer of the structural subunit B. For example, when the polyalkylene oxide having the structural unit of the chemical formula (1) is a polyalkylene oxide having the structural unit represented by the chemical formula (4) or (5) shown above, monomers described in Examples to be described below can be used as the monomers of the structural subunits A and B. For example, when the structural subunit A is represented by one of the chemical formulae (1-1) to (1-15) and (2), a monomer represented by any of the following chemical formulae (6-1) to (6-15) and (2a) may be used as the monomer of the structural subunit A.

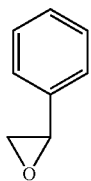 (6-1)

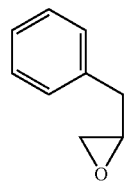 (6-2)

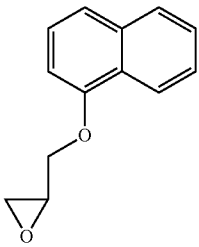 (6-3)

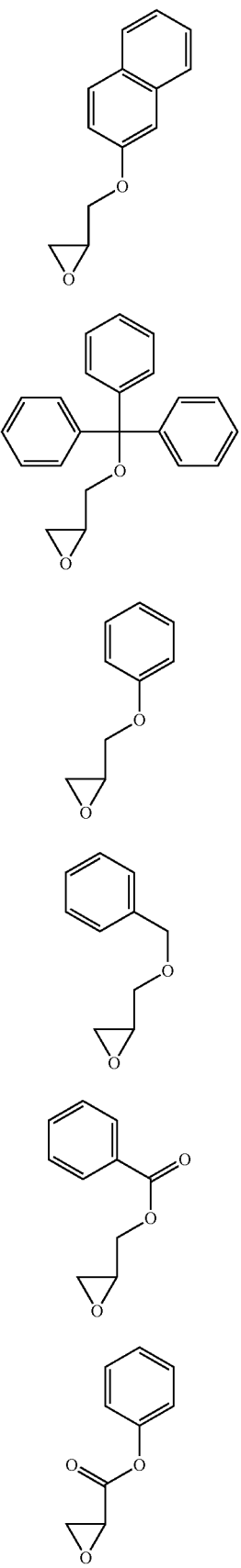
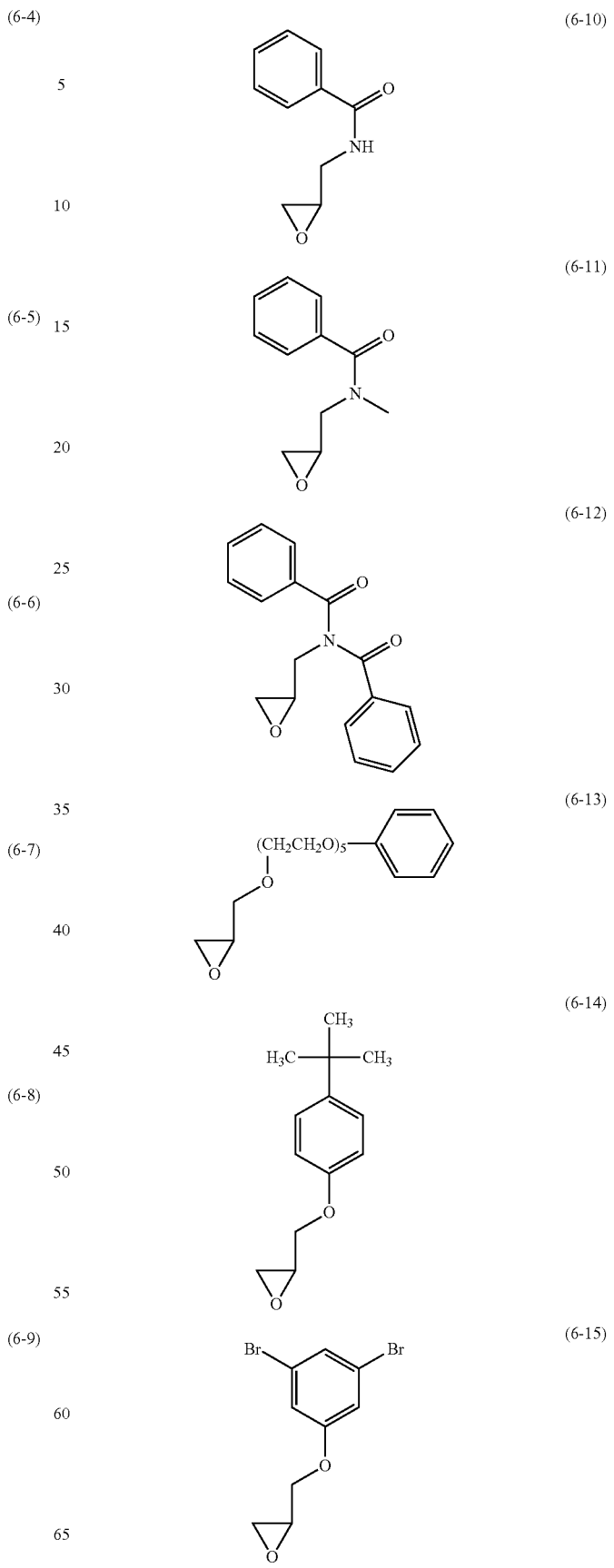

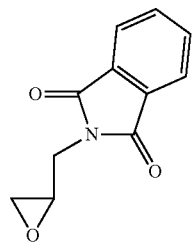

(2a)

Reaction conditions for a copolymerization reaction for synthesizing the polyalkylene oxide having the structural unit represented by the formula (1), such as the copolymerization reaction shown in Scheme 1 or 2, are not particularly limited, and the reaction conditions may be the same as or equivalent to those in a known method, as described above. Specifically, for example, the polyalkylene oxide can be synthesized by subjecting the respective monomer components to ring-opening polymerization for a predetermined reaction time under low temperature conditions from 0° C. to 50° C. or high temperature conditions from 100° C. to 250° C. in an inert gas atmosphere such as nitrogen atmosphere. An autoclave or the like may be used optionally to cause the polymerization reaction under pressurized conditions. The reaction solvent is not particularly limited, and examples thereof include low-polarity solvents such as n-butane, isobutane, n-pentane, cyclopentane, industrial hexane, n-hexane, isohexane, cyclohexane, n-heptane, n-octane, and isooctane. It is preferable to use a polymerization catalyst, when necessary. The reaction conditions for the copolymerization reaction may be the same as or equivalent to those in JP 2006-077039 A, for example. According to the method described in JP 2006-077039 A, the polyalkylene oxide can be synthesized with a high yield by copolymerization using a polymerization catalyst containing a component A (an organic aluminum compound) and a component B (one of an alkali metal alkoxide and an alkali metal hydroxide).

The polyalkylene oxide obtained by the copolymerization reaction may optionally be purified by a known method such as high performance liquid chromatography (HPLC) or column chromatography to improve the purity thereof.

Use of Dispersant

Next, use of the dispersant according to the present invention will be described.

As described above, the dispersant of the present invention includes a polyalkylene oxide having the structural unit of the chemical formula (1), and the polyalkylene oxide includes a structural subunit A having an aryl group on a side chain and a structural subunit B not having an aryl group on a side chain. With this configuration, the dispersant of the present invention can be used as a dispersant applicable to a wide variety of dispersoids and exhibits high dispersing ability. Such an advantageous effect is achieved presumably by the following mechanism. Specifically, in the structural subunit A having an aryl group on a side chain, the aryl group (aromatic ring) has an electron-rich π electron system. Therefore, the structural subunit A interacts with a π electron system on the surface of a dispersoid in a dispersion medium through a π-π interaction, which is different from a hydrophobic interaction and is unique to the aromatic ring. Accordingly, the polyalkylene oxide having the structural unit of the chemical formula (1) causes noncovalent intermolecular interactions with a wide variety of organic particles and inorganic particles. When the polyalkylene oxide having the structural unit of the chemical formula (1) has a plurality of aromatic rings on the side chain, it can achieve multipoint adsorption on the surface of a dispersoid, so that, once it adsorbs onto the surface of the dispersoid, it hardly is separated from the surface. On the other hand, as the structural subunit B not having an aryl group on a side chain, a composition having a high affinity for a dispersion medium is selected as appropriate. With this configuration, the structural subunit B exhibits dispersing ability by forming a layer having a high affinity for the dispersion medium on the surface of the dispersoid. Moreover, because the structural subunit B forms a bulky polymer layer having an affinity for the dispersion medium on the surface of the dispersoid, the polyalkylene oxide having the structural unit of the chemical formula (1) also exhibit an effect of inhibiting reaggregation of the dispersoid, owing to the steric hindrance by the polymer layer. Specifically, for example, π electrons of the aromatic ring on the side chain of the polyalkylene oxide and π electrons of an aromatic ring in an organic pigment (organic fine particles) or a nano-carbon (inorganic fine particles) adsorb each other through a π-π interaction, thereby forming layers of the polyalkylene oxide on surfaces of the organic pigment or the nano-carbon. It is presumed that this inhibits the aggregation of the organic pigment or the nano-carbon, so that the organic pigment or the nano-carbon is dispersed uniformly in the dispersion medium. It is known that an aromatic ring not only exhibits the above-described effect but also causes a hydrophobic interaction and interactions between the π electron system and metals. The dispersant according to the present invention also is effective against dispersoids having no aromatic rings. The above-described mechanism merely is an example of the effect of dispersant according to the present invention, and does not limit the present invention by any means. Furthermore, the dispersant of the present invention includes the structural subunit B whose affinity for a dispersion medium is readily adjustable. Thus, by selecting the composition of the structural subunit B as appropriate, the dispersant of the present invention can be applied to a wide variety of dispersion media. More specifically, for example, the affinity for a dispersion medium can be adjusted by adjusting the proportion (composition) of the structural subunit B in the structural unit of the chemical formula (1). It is considered that the structural subunit B exhibits relatively different hydrophilicities depending on the monomer as a raw material. It is presumed that, for example, ethylene oxide, propylene oxide, and dodecylglycidyl ether exhibits relatively high hydrophilicity in this order (ethylene oxide>propylene oxide>dodecylglycidyl ether). Accordingly, the affinity of the polyalkylene oxide represented by the chemical formula (1) for a dispersion medium also can be adjusted by adjusting the proportion (composition) of the monomer in the structural subunit B. In particular, the dispersant according to the present invention is suitably applicable when the dispersion medium is water, for example.

Unlike hydrophobic groups such as polarity groups and alkyl chains, the aromatic ring in the structural subunit A adsorbs onto a dispersoid through a specific π-π interaction, and thus is highly resistant to interference of external factors. Also, $L^2$-O in the structural subunit B is a nonionic hydrophilic group, and thus is less susceptible to the influence of polarity groups and additives. Accordingly, it is presumed that, even if the structural unit of the chemical formula (1) includes substituents and the like irrelevant to the dispersing ability, the dispersing ability is less susceptible to the influence of these substituents and the like. It is to be noted, however, that this presumption merely is illustrative, and does not limit the present invention by any means.

The dispersant of the present invention exhibits high dispersing ability also for a mixture of a dispersoid and a substance other than the dispersoid. In general, conventional dispersants, including an amphoteric surfactant having a polarity group such as a carboxyl group, lose their dispersing ability when a mixture containing an inorganic salt or the like is added, owing to the change in pH and ion concentration caused by the addition of the mixture, resulting in aggregation of the dispersants themselves. In contrast, the dispersant of the present invention exhibits high dispersing ability without being influenced by the additive. Specifically, for example, the dispersant exhibits high dispersing ability for a mixture of the above-described CNT and an ionic additive(s) such as an inorganic salt <Dispersoid>

The dispersoid is not particularly limited, and examples thereof include inorganic particles, organic particles, inorganic fibers, and organic fibers. They may be self-prepared, or commercially available products may be used.

(Inorganic Particles)

The inorganic particles are not particularly limited, and examples thereof include carbons, silica (silicon oxides), metal particles, metal nanoparticles, and inorganic salts. In the present invention, examples of the inorganic particles include inorganic particles that are surface-modified with an organic functional group. Examples of the inorganic particles that are surface-modified with an organic functional group include CNTs (carbon nanotubes) that are surface-modified with an organic functional group and silica that is surface-modified with an organic functional group. In the present invention, the metal particles are not limited to particles of metals alone and particles of alloys, and also include particles of metal compounds (e.g., metal oxides), as will be described below.

Examples of the carbons include graphite, carbon particles, carbon fibers, and nano-carbons. Examples of the graphite include flake graphite, graphite treated so as to be hydrophilic, and graphite coated with amorphous carbon. Examples of the nano-carbon include: carbon nanotubes (CNTs) such as a single-walled CNT, a double-walled CNT, a multi-walled CNT, and a cup-stacked CNT; carbon nanofibers (CNFs); carbon blacks (CBs) such as furnace black, channel black, acetylene black, Ketjen black, carbon black subjected to an oxidation treatment, and hollow carbon; carbon nanocoils (CNCs); carbon nanohorns (CNHs); fullerene; and graphene. Among them, CNFs and CNTs are preferable. The CNFs are not particularly limited, and CNFs produced by any method such as, e.g., catalytic chemical vapor deposition are applicable to the present invention. The CNTs are not particularly limited, and CNTs produced by any method such as arc discharge, chemical vapor deposition (CVD), or laser ablation are applicable to the present invention. As the CNTs, CNTs with any structure, such as, e.g., a single-walled carbon nanotube, a double-walled carbon nanotube, a multi-walled carbon nanotube, and a cup-stacked carbon nanotube, are applicable to the present invention. The CBs are not particularly limited, and examples thereof include commercially available furnace black, channel black, acetylene black, Ketjen black, carbon black subjected to an oxidation treatment, and hollow carbon. The CNCs are not particularly limited, and CNCs produced by any method, such as, e.g., catalytic pyrolysis of acetylene, are applicable to the present invention. The graphite is not particularly limited, and examples thereof include flake graphite and flake graphite treated so as to be hydrophilic.

Examples of the silica include colloidal silica, fumed silica, and surface-modified silica. Examples of the metal particles include particles of gold, silver, copper, platinum, nickel, palladium, tin, iron, chromium, cobalt, molybdenum, and manganese. The metal particles may be metal oxide particles, metal oxide semiconductor particles, an inorganic pigment, or the like. Examples of the metal oxide particles include particles of tin oxides, titanium oxides, aluminium oxides, zinc oxides, zirconium oxides, and iron oxides. Examples of the metal oxide semiconductor particles include particles of indium gallium zinc oxide (IGZO), indium zinc oxide (IZO), and zinc tin oxide (ZTO). Examples of the inorganic pigment include: color pigments such as titanium oxide (titania) and ocher (iron oxide); and rust preventive pigments such as aluminum phosphomolybdate and aluminum tripolyphosphate. Examples of the metal nanoparticles include fine particles of the metal particles, fine particles of the metal oxides, and fine particles of the metal oxide semiconductors. Examples of the inorganic salts include calcium carbonate.

(Organic Particles)

The organic particles may be, for example, an organic pigment, resin particles, or the like. Examples of the organic pigment include: azo pigments such as azomethine; and polycyclic pigments such as isoindolinone, isoindoline, anthraquinone, anthrone, xanthene, diketopyrrolopyrrole, perylene, perynone, quinacridone, indigoid, dioxazine, and phthalocyanines (phthalocyanine blue, phthalocyanine green, etc.). Examples of the resin particles include particles of polyethylene (PE) resin, polypropylene (PP) resins, polyethylene terephthalate (PET) resins, acrylic resins, methacrylic resins, and polyvinylidene fluoride.

(Organic Fibers)

Examples of the organic fibers include: polyester fibers such as PET, polytrimethylene terephthalate (PTMT), polybutylene terephthalate (PBT), polyethylene naphthalate (PEN), polytrimethylene naphthalate (PTMN), and polybutylene naphthalate (PBN); aramid fibers (e.g., para-aramid fibers and meta-aramid fibers); polyvinylidene fluoride fibers; and cellulose fibers.

As the aramid fibers, either para-aramid fibers obtained by co-condensation polymerization of p-phenylenediamine and terephthalic acid chloride or meta-aramid fibers obtained by co-condensation polymerization of m-phenylenediamine and isophthalic acid chloride may be used, for example. The aramid fibers of 100 to 10000 dtex can be used suitably.

(Inorganic Fibers)

The inorganic fibers are not particularly limited, and examples thereof include carbon fibers, glass fibers, metal fibers, ceramic fibers, and Basalt fibers. Among them, carbon fibers and glass fibers are preferable.

Examples of the carbon fibers include PAN-based carbon fibers, pitch-based carbon fibers, cellulose-based carbon fibers, vapor-grown carbon fibers, and fibers obtained by graphitizing these fibers. The PAN-based carbon fibers are carbon fibers obtained by using polyacrylonitrile fibers as a raw material. The pitch-based carbon fibers are carbon fibers obtained by using petroleum tar or petroleum pitch as a raw material. The cellulose-based carbon fibers are carbon fibers obtained by using viscose rayon, cellulose acetate, or the like as a raw material. The vapor-grown carbon fibers are carbon fibers obtained by using a hydrocarbon or the like as a raw material. Among them, the PAN-based carbon fibers are preferable in terms of favorable balance between the strength and the modulus of elasticity.

As the glass fibers, it is possible to use any glass fibers such as E-glass fibers, C-glass fibers, S-glass fibers, D-glass fibers, AR-glass fibers, and the like, for example. From the viewpoint of cost, E-glass fibers can be used suitably. A suitable fiber diameter of the glass fiber is from 6 to 20 µm. The cross section of the glass fiber is not limited to a circular shape, and a flat glass fiber with an oval or rectangular cross section also can be used, for example.

Examples of the metal fibers include: fibers composed of metals such as gold, silver, aluminum, copper, brass, iron, titanium, nickel, and stainless steel; and fibers composed of composite metals.

The ceramic fibers are not particularly limited, and examples thereof include ceramic fibers obtained by a melting method and containing, as main components, alumina and silica with the mass ratio between the alumina and the silica generally being 30:70 to 60:40. Examples of commercially available ceramic fibers include: "SC-1260 Bulk" manufactured by Shin-Nippon Thermal Ceramics Corporation; "FIBREXCEL bulk fiber" manufactured by Toshiba Monofrax Co., Ltd.; "ISOWOOL 1260 Bulk" manufactured by Isolite Insulating Products Co., Ltd.; and "J Bulk" manufactured by IBIDEN CO., LTD.

The basalt fibers are not particularly limited, and examples thereof include environment-friendly and strong fibers produced by melt-spinning basalt. The basalt fibers are excellent in tensile strength, heat resistance, ultraviolet resistance, and acid and alkali resistance, and have strength comparable to that of the aramid fibers. Examples of commercially available basalt fibers include: "Basalt Chopped Strand" manufactured by JCK CO., LTD.; and "Basalt Chopped Strand" manufactured by Allte Cloth Corporation.

In the present invention, the inorganic fibers or the organic fibers may be in either a continuous state or a discrete state. In order to achieve a more favorable dispersed state, the inorganic fibers or the organic fibers preferably are in a discrete state, and more preferably are chopped fibers.

The thickness (diameter) of the inorganic fibers and/or the organic fibers is not particularly limited, and is about 1 to 20 µm, preferably 3 to 18 µm. It is not preferable that the fibers have a thickness (diameter) of less than 1 µm, because the fibers, which may have carcinogenicity, may be taken into human bodies during the production process or in use. When the fibers have a thickness (diameter) greater than 20 µm, sufficient dispersion uniformity may not be achieved.

The fiber length of the inorganic fibers and/or the organic fibers preferably is from 1 to 50 mm, more preferably from 3 to 30 mm. When the fiber length of the inorganic fibers and/or the organic fibers is shorter than 1 mm, it might be difficult that the inorganic fibers or organic fibers exhibit a reinforcing effect efficiently. When the fiber length of the inorganic fibers and/or the organic fibers is longer than 50 mm, it might be difficult to maintain a favorable dispersed state. The fiber length refers to the length of a single fiber, and can be determined by measuring the length of the single fiber in the axial direction with a vernier caliper or by taking out the single fiber and observing it with a microscope.

In the present invention, the inorganic fibers and/or the organic fibers are added to a dispersion medium together with a dispersant. The amount of the fibers to be added can be adjusted within the range from, for example, 0.1 to 10 g, preferably 0.3 to 7 g, and more preferably 0.5 to 5 g, with respect to 1 l of the dispersion medium. By setting the amount of the fibers to be added in the above-described range, the fibers can be dispersed in the dispersion medium efficiently, so that a dispersion composition in which the components are dispersed uniformly can be obtained in a short time. In order to disperse the inorganic fibers and/or the organic fibers in a dispersion medium, the inorganic fibers and/or the organic fibers are stirred using a suitable device as appropriate. More specifically, for example, a dispersion composition for wet papermaking process can be prepared by adding the dispersant of the present invention and water as a dispersion medium to inorganic fibers (such as carbon fibers or glass fibers) and/or organic fibers (such as polyester fibers or aramid fibers), stirring the mixture with a pulper or the like (disintegration), then transferring the mixture to a chest or the like, and further diluting the mixture with water. The stirring may be carried out using a known technique. For example, various disintegrators (pulpers), various beaters such as a Niagara beater, various refiners such as a single-disc refiner and double-disc refiner, and various mixers can be used to disperse the fibers.

The above-described inorganic fibers and/or organic fibers may be subjected to a surface treatment performed as appropriate when producing a fiber-reinforced plastic material.

In the present invention, the dispersion composition containing the inorganic fibers and/or the organic fibers can be used to produce a fiber sheet by a so-called wet papermaking process (removing the dispersion medium from the dispersion composition and processing the dispersion composition into a sheet). As a paper machine used for a wet papermaking process, it is possible to use a known paper machine such as an inclined-wire paper machine, a cylinder paper machine, a Fourdrinier paper machine, or a Tanmo paper machine. It is preferable to use an inclined-wire paper machine.

In the case where a fiber sheet is produced by such a wet papermaking process, the strength of the fiber sheet imparted by the physical entanglement of the fibers alone may not be sufficient to allow the fiber sheet to be handleable. In such a case, a binder may be added to bind the fibers.

As such a binder component, it is possible to use a binder component generally used in nonwoven fabric production, including resins that melt in hot water, such as acrylic resins, styrene-acrylic resin, epoxy resins, phenol resins, urethane resins, polyamide (nylon) resins, polyester resins, denatured polyester resins (core-sheath structure), polypropylene resins, polyethylene resins, and polyvinyl alcohols.

In the present invention, "uniformity in fiber dispersion" is referred to as "formation", according to the description on pages 126 to 127 of "Shintei Kami Parupu Jiten (Newly Revised Dictionary of Paper and Pulp)" edited by Japan Technical Association of the Pulp and Paper Industry (publication date: Mar. 10, 1973). Deterioration in the formation of a fiber sheet may result in marked decrease in the strength of the fiber sheet. Thus, it is required to provide a fiber sheet with favorable formation. As a method for evaluating the formation, the following methods have been proposed: (1) observing a fiber sheet by seeing sunlight or artificial light through the fiber sheet; and (2) acquiring data on in-plane distribution of the transmission amount of visible light, beta rays, or the like in the form of digital image data by minute spot scanning and analyzing the image data. In the present invention, for example, the formation can be evaluated by the method (1) utilizing visual observation, as described in the Examples below.

<Dispersion Medium>

Examples of a dispersion medium that can be used in the present invention include water, aromatic hydrocarbon solvents, hydrocarbon solvents, halogenated hydrocarbon solvents, ether solvents, ketone solvents, ester solvents, glycol ether solvents, acetic ester solvents, dialkyl ether solvents, alcohol solvents, glycol solvents, nitrile solvents, and carbonate solvents. Examples of the aromatic hydrocarbon solvents include toluene and xylene. Examples of the hydrocarbon solvents include n-hexane, n-heptane, and cyclohexane. Examples of the halogenated hydrocarbon solvents include methylene chloride, chloroform, dichloroethane, hydrochlorofluorocarbon (HCFC), and hydrofluorocarbon (HFC). Examples of the ether solvents include diethyl ether, diisopropylether, dibutyl ether, butylethylether, methyl-t-butyl ether, terpinyl methyl ether, dihydroterpinyl methyl ether, ethylene glycol dimethyl ether (diglyme), dioxane, tetrahydrofuran, and 1,3-dioxolane. Examples of the ketone solvents include acetone, methyl ethyl ketone, methyl propyl ketone, diethyl ketone, methyl n-butyl ketone, methyl isobutyl ketone, dipropyl ketone, diisobutyl ketone, methyl pentyl ketone, acetophenone, acetonyl acetone, cyclohexanone, methylcyclohexanone, 2-(1-cyclohexenyl)cyclohexanone, and isophorone. Examples of the ester solvents include ethyl formate, n-propyl formate, isopropyl formate, n-butyl formate, isobutyl formate, sec-butyl formate, tert-butyl formate, pentyl formate, methyl acetate, ethyl acetate, n-propyl acetate, isopropyl acetate, n-butyl acetate, isobutyl acetate, sec-butyl acetate, tert-butyl acetate, (iso)pentyl acetate, 3-methoxybutyl acetate, sec-hexyl acetate, 2-ethylbutyl acetate, 2-ethylhexyl acetate, cyclohexyl acetate, benzyl acetate, methyl propionate, ethyl propionate, butyl propionate, (iso)hexyl propionate, methyl monochloroacetate, ethyl monochloroacetate, butyl monochloroacetate, methyl acetoacetate, ethyl acetoacetate, ethyl lactate, and γ-butyrolactone. Examples of the glycol ether solvents include ethylene glycol monomethyl ether, ethylene glycol monoethyl ether, ethylene glycol mono(iso)propyl ether, ethylene glycol monobutyl ether, diethylene glycol monoethyl ether, diethylene glycol mono-n-butyl ether, propylene glycol monomethyl ether, propylene glycol monoethyl ether, propylene glycol mono-n-propyl ether, propylene glycol mono-n-butyl ether, dipropylene glycol monomethyl ether, dipropylene glycol monoethyl ether, dipropylene glycol mono-n-propyl ether, dipropylene glycol mono-n-butyl ether, triethylene glycol monomethyl ether, triethylene glycol monoethyl ether, triethylene glycol mono-n-propyl ether, triethylene glycol mono-n-butyl ether, tripropylene glycol monoethyl ether, tripropylene glycol mono-n-propyl ether, and tripropylene glycol mono-n-butyl ether. Examples of the acetic ester solvents include the above-described glycol ether solvents and monoethers thereof. Examples of the &alkyl ether solvents include diethylene glycol dimethyl ether, diethylene glycol diethyl ether, diethylene glycol methyl isobutyl ether, dipropylene glycol dimethyl ether, and dipropylene glycol diethyl ether. Examples of the alcohol solvents include methanol, ethanol, n-propyl alcohol, isopropyl alcohol, n-butyl alcohol, isobutyl alcohol, sec-butyl alcohol, t-butyl alcohol, heptanol, n-amyl alcohol, sec-amyl alcohol, n-hexyl alcohol, tetrahydrofurfuryl alcohol, furfuryl alcohol, allyl alcohol, ethylene chlorohydrin, octyldodecanol, 1-ethyl-1-propanol, 2-methyl-1-butanol, isoamyl alcohol, t-amyl alcohol, sec-isoamyl alcohol, neoamyl alcohol, hexyl alcohol, 2-methyl-1-pentanol, 4-methyl-2-pentanol, heptyl alcohol, n-octyl alcohol, 2-ethylhexyl alcohol, nonyl alcohol, decyl alcohol, undecyl alcohol, lauryl alcohol, cyclopentanol, cyclohexanol, benzyl alcohol, α-terpineol, terpineol C, L-α-terpineol, dihydroterpineol, terpinyl oxyethanol, dihydroterpinyl oxyethanol, cyclohexanol, 3-methoxybutanol, diacetone alcohol, 1,4-butanediol, and octanediol. Examples of the glycol solvents include ethylene glycol, diethylene glycol, triethylene glycol, propylene glycol, dipropylene glycol, 1,3-butylene glycol, hexylene glycol, polyethylene glycol, and polypropylene glycol. Examples of the amine solvents include triethylamine, dimethylacetamide (DMAc), and dimethylformamide (DMF). Examples of the nitrile solvents include acetonitrile, benzonitrile, and dicyanomethane. Examples of the carbonate solvents include diethyl carbonate, ethylene carbonate, and propylene carbonate. A dispersion medium that can be used in the present invention may have a reactive group, and examples of such a dispersion medium include unsaturated ethylene monomers and oligomers, such as (meth)acrylic acids, (meth)acrylic esters, vinyl esters, vinyl ethers, allyl esters, and allyl ethers; epoxy monomers and oligomers, such as alkylene oxides and glycidyl ethers; and isocyanate monomers and oligomers, such as isocyanate and polyisocyanate. Furthermore, the dispersion medium that can be used in the present invention is not limited to those given above, and various types of resins and oligomers, as well as monomers thereof, also can be used without any limitation. Specific examples of the dispersion medium include acrylic resins, vinyl resins, polyester resins, polycarbonate resins, polyether resins, polyol resins, urethane resins, epoxy resins, silicone resins, and fluorine resins Specific examples of the polyether resins include the dispersant of the present invention. That is, the dispersant of the present invention also may serve as the dispersion medium. Only one type of dispersion medium may be used, or two or more types of dispersion media may be used in combination.

[II. Dispersion Composition]

Next, the dispersion composition of the present invention will be described. The dispersion composition contains the dispersant and the dispersoid, and further may contain the dispersion medium as an optional component.

<Additives>

The dispersion composition of the present invention further may contain an additive(s) as appropriate as an optional component. Specifically, for example, the dispersion composition of the present invention may contain, as an additive(s), a known penetrant, humectant, antifoaming agent, thickening agent, viscosity modifier, pH adjuster, and/or the like, within a range where the dispersing ability is not impaired by the additive(s). The penetrant (lubricating penetrant) is not particularly limited, and examples thereof include surfactants. The surfactants are not particularly limited, and examples thereof include: anionic surfactants (specifically, "PELEX OT-P [trade name]" manufactured by Kao Corporation); weakly cationic nonionic surfactants (specifically, "AMIET 320 [trade name]" manufactured by Kao Corporation); and amino acid surfactants (specifically, "Pellicer L-30 [trade name]" manufactured by Asahi-Kasei Chemicals Corporation). The dispersion composition of the present invention may contain, for example, an ionic additive such as an organic acid, an inorganic acid, an organic base, an inorganic base, or a salt thereof as an additive.

<Blended Amount>

The blended amount (wt %) of the dispersant in the dispersion composition is not particularly limited, and can be adjusted as appropriate. In the present invention, the blended amount (wt %) of the dispersant in the dispersion composition refers to the blended amount (wt %) of the polyalkylene oxide of the chemical formula (1) in the dispersion composition. The blended amount (wt %) of the dispersant varies greatly depending on the type of the dispersoid, the intended use of the dispersion composition, etc. In the case of an aqueous dispersion composition containing carbon nanofibers (CNFs) as the dispersoid, the blended amount (wt %) of the dispersant in the dispersion composition is, for example, more than 0, preferably $1 \times 10^{-5}$ wt % to 30 wt %, more preferably $1 \times 10^{-3}$ wt % to 20 wt %, still more preferably 0.1 to 10 wt %, and yet more preferably 0.5 to 5 wt %. For example, when the polyalkylene oxide is used in combination with a dispersant other than the polyalkylene oxide, the polyalkylene oxide of the chemical formula (1) can exhibit a dispersing effect at a very low concentration (i.e., when the blended amount thereof is small). In this case, for example, even when the other dispersant alone does not exhibit a dispersing effect, a dispersing effect can be obtained by using the polyalkylene oxide of the chemical formula (1) in combination with the other dispersant.

The blend ratio of the dispersant to the dispersoid (dispersant/dispersoid) is not particularly limited, and can be adjusted as appropriate. The blend ratio of the dispersant to the dispersoid (dispersant/dispersoid) varies greatly depending on the type of the dispersoid, the use of the dispersion composition, etc. In the case of an aqueous dispersion composition containing carbon nanofibers (CNFs) as the dispersoid, the blend ratio of the dispersant to the dispersoid (dispersant/dispersoid) is, for example, 0.0001 to 20, preferably 0.01 to 10, more preferably 0.1 to 5, and still more preferably 0.2 to 2.

Next, the method for preparing the dispersion composition of the present invention will be described. The method for preparing the dispersion composition of the present invention is not particularly limited, and the dispersion composition may be prepared using a known dispersion method. Specifically, the dispersion composition is prepared by, for example, mixing the dispersant and the dispersoid with the dispersion medium, and heating and/or stirring the resultant mixture when necessary. The stirring may be performed using a known technique. Specific examples of the known technique include: ultrasonic irradiation; high pressure mixing; and stirring with the use of a homomixer, a homogenizer, a bead mill, a ball mill, a roll mill, or the like. These known techniques may be used in any combination.

The dispersion composition of the present invention is not particularly limited, and can be used in various technical fields relating to, e.g., hybrid materials, surface protective materials, conductive pastes, conductive inks, sensors, precision analysis elements, optical memories, liquid crystal displays, nanomagnets, heat transfer media, high-performance catalysts for fuel cells, organic solar cells, nano-glass devices, abrasive agents, drug carriers, environmental catalysts, paints, printing inks, ink-jet inks, resists for color filters, inks for writing tools, optical thin films, adhesives, antireflection films, hard coat films, and materials for fiber-reinforced plastics.

EXAMPLES

Examples of the present invention will be described below together with Comparative Examples. It is to be noted, however, that the present invention is by no means limited to these Examples. In the following description, the term "part(s)" used to describe the blended amount means "part(s) by weight", and the unit "%" means "wt %".

[Weight-Average Molecular Weight (Mw) of Polyalkylene Oxide]

The weight-average molecular weight (Mw) of each polymer synthesized in the following examples and comparative examples was measured by gel permeation chromatography (GPC) using the following device under the following measurement conditions. As described below, in Examples 1-1 to 1-3 and 1-7 and Comparative Example 1-4, tetrahydrofuran (THF) was used as an eluent, and in Comparative Examples 1-5 to 1-6, distilled water was used as an eluent. In Examples 1-1 to 1-3 and Comparative Examples 1-4 to 1-6, polyethylene oxide was used as a calibration standard, and in Example 1-7, polystyrene was used as a calibration standard.

Device: trade name "LC-10AD (Shimadzu Corporation)"
Detector: differential refractive index detector (RID)
Column (in the case where THF was used as the eluent): trade name: "SHODEX KF-804 (Showa Denko K.K.)"
Column (in the case where distilled water was used as the eluent):
    trade name: "Asahipak GS-710 (Asahi Chemical Industry Co., Ltd.)"
Measurement temperature: 30° C.
Eluent: THF or distilled water
Flow rate: 1.0 ml/min
Sample concentration: 0.2 wt % (THF or distilled water)
Sample injection volume: 100 μl
Calibration standard: polyethylene oxide or polystyrene

[Copolymerization Ratio of Polyalkylene Oxide]

The copolymerization ratio of each polymer synthesized in the following Examples and Comparative Examples was measured by $^1$H-NMR under the following measurement conditions.

<Measurement Conditions>
Instrument: trade name: "JNM-AL 400 (JEOL Ltd.)"
Observing nucleus: 1H
Observation range: 7992.01 Hz
Number of data points: 32768
Pulse width: 5.80 μsec
Latency: 50.00 μsec
Cumulative number: 512
Measurement temperature: 25° C.
Solvent for measurement: deuterated chloroform
Sample concentration: 0.01 g/ml Example 1-1

Synthesis of Dispersant 1

Monomers were copolymerized at the copolymerization ratio (molar ratio) shown in the row of "Dispersant 1" in Table 2 below. Thus, a white solid polymer (dispersant 1) was obtained. The copolymerization was caused in a stirrer-equipped pressure resistant vessel (autoclave), using a solvent (n-hexane) and a polymerization catalyst in a nitrogen atmosphere at room temperature (20° C. to 25° C.). The polymerization catalyst and reaction conditions other than the above-described conditions were as described in Examples of JP 2006-077039 A.

Example 1-2

Synthesis of Dispersant 2

Monomers were copolymerized in the same manner as in Example 1-1, except that the copolymerization ratio (molar ratio) shown in the row of "Dispersant 2" in Table 2 was used. Thus, a white solid polymer (dispersant 2) was obtained.

Example 1-3

Synthesis of Dispersant 3

Monomers were copolymerized in the same manner as in Example 1-1, except that the copolymerization ratio (molar ratio) shown in the row of "Dispersant 3" in Table 2 was used. Thus, a pale yellow viscous solid polymer (dispersant 3) was obtained.

Comparative Example 1-4

Synthesis of Dispersant 4

Monomers were copolymerized in the same manner as in Example 1-1, except that the copolymerization ratio (molar ratio) shown in the row of "Dispersant 4" in Table 2 was used. Thus, a white solid polymer (dispersant 4) was obtained.

Comparative Example 1-5

Synthesis of Dispersant 5

Monomers were copolymerized in the same manner as in Example 1-1, except that the copolymerization ratio (molar ratio) shown in the row of "Dispersant 5" in Table 2 was used. Thus, a white solid polymer (dispersant 5) was obtained.

Comparative Example 1-6

Synthesis of Dispersant 6

Monomers were copolymerized in the same manner as in Example 1-1, except that the copolymerization ratio (molar ratio) shown in the row of "Dispersant 6" in Table 2 was used. Thus, a white solid polymer (dispersant 6) was obtained.

Example 1-7

Synthesis of Dispersant 7

Monomers were copolymerized in the same manner as in Example 1-1, except that the copolymerization ratio (molar ratio) shown in the row of "Dispersant 7" in Table 2 was used. Thus, a white solid polymer (dispersant 7) was obtained.

The weight-average molecular weights of the thus-obtained respective polymers (dispersants 1 to 7) were measured by GPC. The results thereof are shown in Table 2 below.

Figure 2:
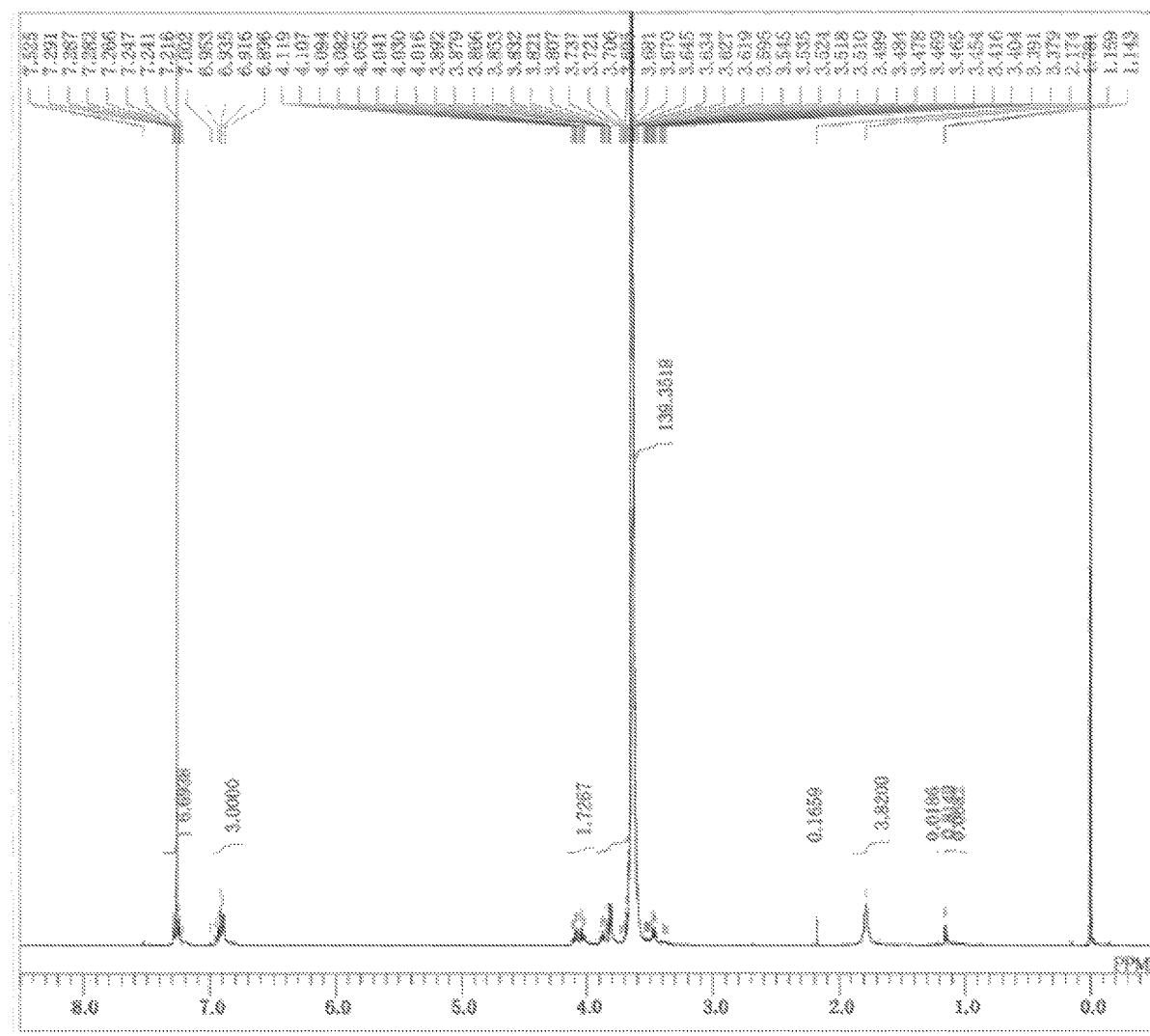
FIG. 2 shows the result of $^1$H-NMR measurement regarding a polyalkylene oxide (dispersant 2) obtained in Example 1-2.
Figure 3:
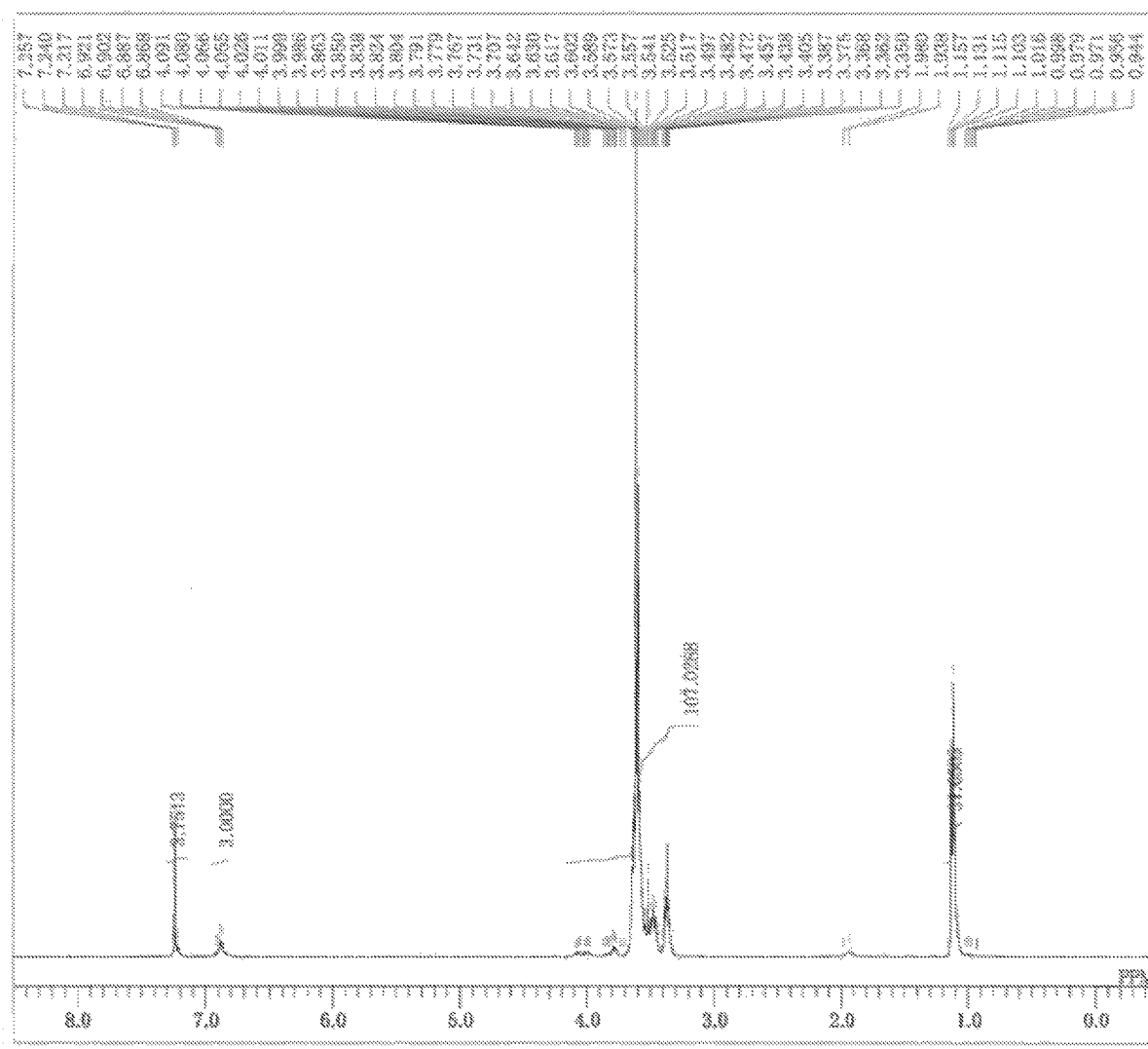
FIG. 3 shows the result of $^1$H-NMR measurement regarding a polyalkylene oxide (dispersant 3) obtained in Example 1-3.
Figure 4:
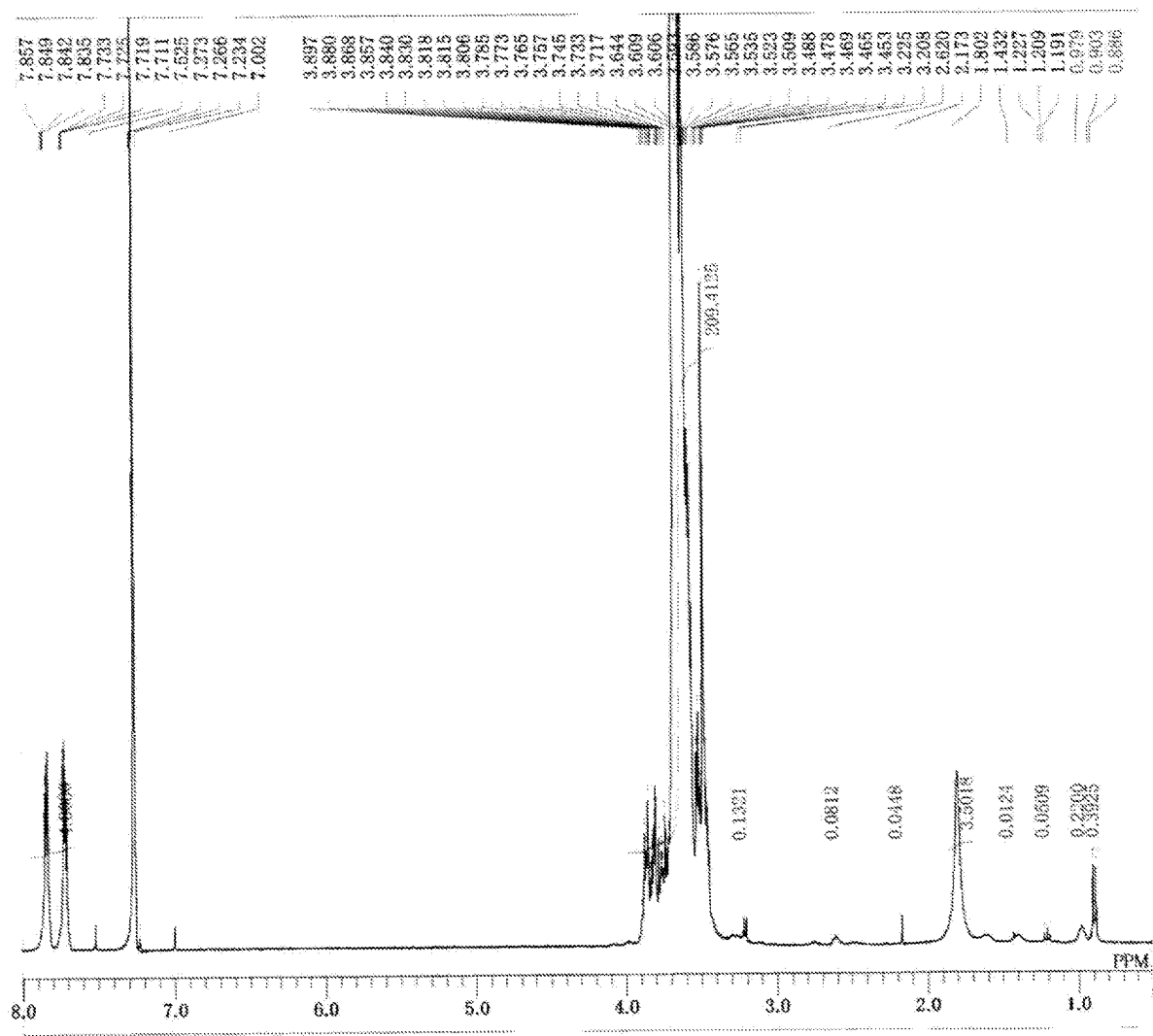
FIG. 4 shows the result of $^1$H-NMR measurement regarding a polyalkylene oxide (dispersant 7) obtained in Example 1-7.

The copolymerization ratios of the thus-obtained respective polymers (dispersants 1 to 7) were measured by $^1$H-NMR. Among them, the measurement results obtained regarding Examples 1-1 (dispersant 1), 1-2 (dispersant 2), 1-3 (dispersant 3), and 1-7 (dispersant 7) are shown in FIGS. 1 to 4, respectively.

TABLE 2

| | Copolymerization Ratio (*1) (EO:PO:PGE) | Copolymerization Ratio (*2) (EO:NGPI) | Weight-average molecular weight |
|---|---|---|---|
| Dispersant 1 | 95.1:0.7:4.2 | — | 88400 |
| Dispersant 2 | 89.8:1.0:9.2 | — | 81100 |
| Dispersant 3 | 51.0:39.2:9.8 | — | 33100 |
| Dispersant 4 | 92.1:7.9:0 | — | 137800 |
| Dispersant 5 | 100:0.0:0.0 | — | 64600 |
| Dispersant 6 | 100:0.0:0.0 | — | 110100 |
| Dispersant 7 | — | 97.9:2.1 | 67700 |

(*1) EO = ethylene oxide
PO = propylene oxide
PGE = phenyl glycidyl ether
The copolymerization ratio indicates the polymerization ratio (molar ratio) of the respective monomers, namely, ethylene oxide and N-glycidylphthalimide from the left.
(*2) EO = ethylene oxide
NGPI = N-glycidylphthalimide The copolymerization ratio indicates the polymerization ratio (molar ratio) of the respective monomers, namely, ethylene oxide and N-glycidylphthalimide from the left.

The following chemical formulae (E1) to (E3) show the structures of the dispersants 1 to 3 obtained in Examples 1-1 to 1-3, respectively.

(E1)

(E2)

(E3)

The following chemical formula (E4) to (E6) show the structures of the dispersants 4 to 6 obtained in Comparative Examples 1-4 to 1-6, respectively.

(E4)

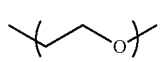

(E5)~(E6)

The following chemical formula (E7) shows the structure of the dispersant 7 obtained in Example 1-7.

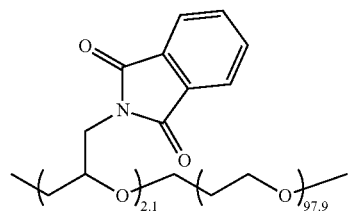

(E7)

Example 2

Preparation 1 of CNF Dispersion Composition

Components of dispersion compositions shown in Table 3 below were mixed together, and the resultant mixtures were stirred at room temperature using a homomixer ("TK Homomixer HV-M [Tokushu Kika Kogyo Co., Ltd.]") at 10000 rpm for 30 minutes. Thus, dispersion compositions of Examples 2-1 to 2-3 and Comparative Example 2-4 were obtained.

Evaluation of Dispersion Stability

The dispersion compositions of Examples 2-1 to 2-3 and Comparative Example 2-4 were allowed to stand still at room temperature for one week after the preparation. Then, the dispersion stability of each dispersion composition one week after the preparation was evaluated through visual observation. The visual evaluation was made on the basis of the following evaluation criteria.

Evaluation Criteria for Visual Evaluation

AA: No separation of the dispersoid was observed, and the dispersoid was dispersed uniformly.
A: Although no separation of the dispersoid was observed, slight aggregation and precipitation were observed.
A−: A transparent layer was formed slightly, and aggregation and precipitate were observed.
B: The dispersoid was separated, and formation of a large transparent layer was observed.
C: The dispersoid was separated and precipitated completely.

The dispersion compositions of Examples 2-1 to 2-3 and Comparative Example 2-4 are shown in Table 3, together with the results of the evaluation.

TABLE 3

|  |  | Example | | | Comparative Example |
|---|---|---|---|---|---|
|  |  | 2-1 | 2-2 | 2-3 | 2-4 |
| Dispersant | 20 wt % dispersant 1 (*1) | 15 | — | — | — |
|  | 20 wt % dispersant 2 (*1) | — | 15 | — | — |
|  | 20 wt % dispersant 3 (*1) | — | — | 15 | — |
|  | 20 wt % dispersant 5 (*1) | — | — | — | 15 |
| | CNF (*2) | 3 | 3 | 3 | 3 |
| | Distilled water | 132 | 132 | 132 | 132 |
| | Dispersoid/dispersant (*3) | 1 | 1 | 1 | 1 |
| Evaluation | 1 week after preparation | A | A | A | C |

* The numerical values in Table 3 indicate the blended amounts (g).
(*1) Each "20 wt % dispersant" refers to the dispersant diluted with water in such a manner that the blended amount thereof would be 20 parts by weight with respect to 100 parts by weight of water.
(*2) "VGCF ®-H (Showa Denko K.K.)"
(*3) The "dispersoid/dispersant" indicates the blend ratio (=the blended amount of the dispersoid/the blended amount of the dispersant).

As can be seen from Table 3, in Examples 2-1 to 2-3 where the polyethylene oxides having aryl groups on the side chains were used as the dispersants, the dispersants exhibited very high dispersion stability for the CNF. In contrast, when the polyalkylene oxide with no aryl group on the side chains was used as a dispersant, the dispersing ability for the CNF was much lower as compared with the cases where the dispersants of the present invention were used.

Example 3

Preparation 2 of CNT Dispersion Compositions

Components of dispersion compositions shown in Table 4 were mixed together, and the resultant mixtures were stirred at room temperature using a homomixer "TK Homomixer HV-M (trade name, manufactured by Tokushu Kika Kogyo Co., Ltd.)" at 10000 rpm for 30 minutes. Thus, dispersion compositions of Examples 3-1 and 3-2 and Comparative Example 3-3 were obtained.

Evaluation of Dispersion Stability

Regarding each of the dispersion compositions of Examples 3-1 and 3-2 and Comparative Example 3-3, the dispersion stabilities in the following three states were evaluated through visual observation:
(1) the state immediately after the preparation when the dispersion composition was diluted 2-fold with water;
(2) the state immediately after the preparation when the dispersion composition was diluted 10-fold with water; and
(3) the state one month after the preparation.
As shown in the above item (1) to (2), evaluation of the composition immediately after the preparation was made in the state where the composition was diluted with water as a dispersion medium. The evaluation was made on the basis of the same evaluation criteria as in Example 2.

The dispersion compositions of Examples 3-1 and 3-2 and Comparative Example 3-3 are shown in Table 4, together with the results of the evaluation.

TABLE 4

|  |  | Example | | Comparative Example |
|---|---|---|---|---|
|  |  | 3-1 | 3-2 | 3-3 |
| Dispersant | Dispersant 1 | 5 | — | — |
|  | Dispersant 3 | — | 5 | — |
|  | Dispersant 6 | — | — | 5 |
| | CNT (*1) | 5 | 5 | 5 |
| | Distilled water | 90 | 90 | 90 |

TABLE 4-continued

|  |  | Example | | Comparative Example |
|---|---|---|---|---|
|  |  | 3-1 | 3-2 | 3-3 |
| Dispersoid/dispersion medium (*2) | | 1 | 1 | 1 |
| Evaluation | Immediately after preparation (1:1) (*3) | A | A | A |
|  | Immediately after preparation (1:9) (*4) | A | A– | C |
|  | 30 days after preparation (*5) | AA | A | B |

* The numerical values in Table 4 indicate the blended amounts (g).
(*1) "Baytubes C-150P (Bayer Material Science AG)"
(*2) The "dispersoid/dispersant" indicates the blend ratio (=the blended amount of the dispersoid/the blended amount of the dispersant).
(*3) Evaluation immediately after the preparation when the dispersant was diluted 2-fold with water
(*4) Evaluation immediately after the preparation when the dispersant was diluted 10-fold with water
(*5) Evaluation one month after the preparation As can be seen from Table 4, it was found that, in Examples 3-1 and 3-2 where the polyalkylene oxides having aryl groups on the side chains were used as the dispersants, the dispersion compositions exhibited high dispersion stability even in the case where the dispersion compositions immediately after the preparation were diluted 10-fold with the dispersion medium. This result suggests that the dispersion composition according to the present invention can be diluted as appropriate to adjust the viscosity thereof, when the dispersion composition is used for molding or the like, for example. Also, it was found that, in Examples 3-1 and 3-2, the dispersion compositions even 30 days after the preparation exhibited very high dispersion stability for the CNT over a long period of time. In particular, the dispersant 1 containing the polyalkylene oxide having a weight-average molecular weight of 88,422 exhibited higher dispersion stability than the dispersant 3 containing the polyalkylene oxide having a weight-average molecular weight of 33,054. In contrast, when the polyalkylene oxide with no aryl group on the side chains was used as a dispersant, the dispersing ability for the CNF was much lower as compared with the cases where the dispersants of the present invention were used.

Example 4

Preparation 3 of CNT Dispersion Composition

Components of dispersion compositions shown in Table 5 were mixed together, and the resultant mixtures were stirred at room temperature using a homomixer "TK Homomixer HV-M (trade name, manufactured by Tokushu Kika Kogyo Co., Ltd.)" at 3000 to 5000 rpm for 30 minutes. Thereafter, each of the solutions obtained after the stirring was treated four times at a flow rate of 5 l/hr using a disperser (Slide Ring Seal type DYNO-MILL KDL-Special [trade name, Shinmaru Enterprises Corporation]) and AIMEX beads No. 1510 (soda-lime glass)/0.5 to 0.8 mm (trade name, IMEX CO., LTD.). Thus, CNT dispersion compositions of Examples 4-1 to 4-13 were obtained.

Regarding each of the CNT dispersion compositions of Examples and Comparative Examples, (a) dispersion stability, (b) adhesion, and (c) surface resistance were evaluated. If the CNT dispersion compositions have favorable dispersing ability, the surface resistances are low, so that sufficiently high adhesion can be achieved.

Evaluation of Dispersion Stability

The dispersion compositions of Examples 4-1 to 4-13 were allowed to stand still at room temperature for one week after the preparation. Then, the dispersion stability of each dispersion composition one week after the preparation was evaluated through visual observation. The visual evaluation was made based on the same evaluation criteria as in Example 2.

Evaluation of Adhesion

The CNT dispersion composition was applied onto a polyethylene terephthalate (PET) film (trade name "Teijin Matte Film PS", Teijin DuPont Films Japan Limited) using an applicator "Baker-type Applicator (trade name, Yasuda Seiki Seisakusho Ltd.)", thus forming a coating film. Next, in order to evaluate the adhesion of CNT to the PET film (base), a curing tape (Floor Curing Tape "No. 395" Sakura (trade name, Nitto Denko Corporation)" was adhered to the coating film. The experimenter then put his finger on the tape and moved the finger back and forth 10 times while pressing the tape. Thereafter, the curing tape was peeled off, and the state of the tape was evaluated through visual observation.

Evaluation Criteria for Visual Evaluation
A: CNT was attached only slightly on the tape or not at all attached on the tape.
B: CNT was attached densely on part of the tape.
C: CNT was attached densely on the entire surface of the tape.

Evaluation of Surface Resistance

The surface resistance of each coating film was measured using a MULUTITESTER F-80 TR-D (trade name, Sanwa Electric Instrument Co., Ltd.).

The results of the respective evaluations for the dispersion compositions of Examples 4-1 to 4-13 are shown in Table 5.

TABLE 5

| | | Example | | | | | | | | | | | | |
|---|---|---|---|---|---|---|---|---|---|---|---|---|---|---|
| | | 4-1 | 4-2 | 4-3 | 4-4 | 4-5 | 4-6 | 4-7 | 4-8 | 4-9 | 4-10 | 4-11 | 4-12 | 4-13 |
| Dispersant | Dispersant 1 | 40 (1.8%) | 20 (2.0%) | 20 (1.0%) | 20 (1.0%) | 20 (1.0%) | — | — | — | — | — | 40 | 40 | 40 |
| | Dispersant 2 | — | — | — | — | — | 20 (1.0%) | 20 (1.0%) | 40 (2.0%) | — | | | | |
| | Dispersant 3 | — | — | — | — | — | — | — | — | 40 (1.8%) | | | | |
| | Dispersant 7 | | | | | | | | | | 33.6 (4.0%) | | | |
| Dispersoid | CNT (*1) | 40 (1.8%) | 40 (1.0%) | — | 80 (4.0%) | — | 40 (2.0%) | — | 80 (4.0%) | 40 (1.8%) | 33.6 (4.0%) | 40 | 40 | 40 |
| | C-Nano (*2) | — | — | 40 (2.0%) | — | 80 (4.0%) | — | 40 (2.0%) | — | — | — | | | |
| Lubricating penetrant (*3) | | — | — | — | — | — | — | — | — | — | 3.3 | 4 | 6 | 4 |
| Distilled water | | 2180 | 1940 | 1940 | 1900 | 1900 | 1940 | 1940 | 1900 | 2180 | 1478 | 1756 | 1754 | 1756 |

TABLE 5-continued

| | | Example | | | | | | | | | | | | |
|---|---|---|---|---|---|---|---|---|---|---|---|---|---|
| | | 4-1 | 4-2 | 4-3 | 4-4 | 4-5 | 4-6 | 4-7 | 4-8 | 4-9 | 4-10 | 4-11 | 4-12 | 4-13 |
| | Dispersoid/dispersion medium (*4) | 1 | 2 | 2 | 4 | 4 | 2 | 2 | 2 | 1 | 1 | 1 | 1 | 1 |
| Evaluation | Dispersion stability | AA | AA | AA | A | A | AA | AA | AA | A | AA | AA | AA | AA |
| | Adhesion | A | B | A | A | B | B | B | A | B | A | A | A | A |
| | Surface resistance ($\Omega/\square$) | 532 | 418 | 248 | 176 | 136 | 296 | 146 | 214 | 356 | | | | |

*The numerical values in Table 5 indicate the blended amounts (g).
(*1) "Baytubes C-150P (trade name, Bayer Material Science AG)"
(*2) "FloTube 9000 (trade name, CNano Technology limited)"
(*3) Example 4-10: "PELEX OT-P (trade name, Kao Corporation)" Example 4-11: "PELEX OT-P (trade name, Kao Corporation)" Example 4-12: "Pellicer L-30 (trade name, Asahi-Kasei Chemicals Corporation)" Example 4-13: "AMIET 320 (trade name, Kao Corporation)"
(*4) The "dispersoid/dispersant" indicates the blend ratio (= the blended amount of the dispersoid/the blended amount of the dispersant).

In Examples 4-10 to 4-13, a lubricating penetrant was used as an additive. The dispersants of Examples 4-10 to 4-13 are nonionic polymeric surfactants having a polyethylene oxide skeleton, and the dispersing abilities of the dispersants of Examples 4-10 to 4-13 were not impaired in the presence of the additive.

In general, in a composition containing a dispersant, a main factor influencing the dispersing ability is the polarity of an additive. In Examples 4-10 to 4-13, three types of lubricating penetrants (additives) that differ from each other in polarity etc., namely, an anion lubricating penetrant (PELEX OT-P), a weakly cationic nonionic lubricating penetrant (AMIET 320), and an amino acid lubricating penetrant (Pellicer), were used, respectively. The fact that nonionic surfactants, which do not have a polarity group, are less susceptible to the influence of use conditions such as the ionicity of an additive and pH is known commonly, as disclosed in JP 2001-354847 A, for example. As described above, in the present example, the additive added to the compositions containing the dispersants did not influence the dispersing abilities.

Furthermore, as can be seen from Table 5, in Examples 4-1 to 4-10 where the polyalkylene oxides with aryl groups on the side chains were used as the dispersants, the dispersion compositions exhibited very high dispersion stability for the CNT. Furthermore, as a result of the evaluation performed by applying the dispersion compositions of the present invention onto the PET film (base), it was also found that the adhesion of the CNT was favorable. Still further, the coating films formed by the dispersion compositions of Examples 4-1 to 4-9 were low. Thus, the dispersion compositions of Examples 4-1 to 4-9 also exhibited favorable results in the surface resistances evaluation.

Example 5

Preparation of PET Fiber Dispersion Compositions

Prior to preparation of a PET fiber dispersion composition, a pre-dispersion solution of PET fibers was prepared. Specifically, first, 1558 g of hot water of 40° C. was added to 200 g of the PET fibers ("EPO43×5 [Kuraray Co., Ltd.]"), and then stirred at 40° C. for 3 hours. Next, the stirred aqueous solution was filtered through a filter paper ("Filter Paper No. 2 φ125 mm [Advantech Co., Ltd.]"), and further washed away with 300 ml of distilled water on the filter paper. Then, the PET fibers obtained after the filtering were dried at 20° C. for 96 hours with a fan dryer (hot air circulation-type incubator [Ohtori Manufacturing Co., Ltd.]). Thus, the PET fibers (PET in Table 6) were obtained.

Components of dispersion compositions shown in Table 6 were mixed together, and the resultant mixtures were stirred at room temperature using a propeller-type stirrer ("MA-ZERA NZ-1100 [trade name, EYERA]") at 300 rpm for 2 hours. Thus, PET fiber dispersion compositions of Example 5-1 and Comparative Examples 5-2 to 5-3 were obtained.

Regarding each of the PET fiber dispersion compositions of Example 5-1 and Comparative Examples 5-2 to 5-3, the dispersion stabilities in the following two states were evaluated through visual observation:
(1) the state immediately after the preparation; and
(2) the state 5 days after the preparation.

Evaluation Criteria for Visual Evaluation
AA: The PET fibers were dispersed completely.
A: Although no fiber bundle was observed, unevenness in fiber density was observed in the PET fiber dispersion composition.
B: Fiber bundles were observed.
C: Fiber bundles were observed in a totally unloosened state.

The dispersion compositions of Example 5-1 and Comparative Examples 5-2 to 5-3 are shown in Table 6, together with the results of the evaluation.

TABLE 6

| | | Example | Comparative Example | |
|---|---|---|---|---|
| | | 5-1 | 5-2 | 5-3 |
| Dispersant | Dispersant 2 | 4 (2.0%) | — | — |
| | Dispersant 5 | — | 4 (2.0%) | — |
| | PET | 0.5 | 0.5 | 0.5 |
| | Distilled water | 195.5 | 195.5 | 199.5 |
| | Dispersoid/dispersant (*1) | 0.125 | 0.125 | — |
| Evaluation | Immediately after preparation | AA | C | C |
| | 5 days after preparation | A | C | C |

* The numerical values in Table 6 indicate the blended amounts (g).
(*1) The "dispersoid/dispersant" indicates the blend ratio (=the blended amount of the dispersoid/the blended amount of the dispersant).

As can be seen from Table 6, in Example 5-1 where the polyalkylene oxide with aryl groups on the side chains was used as the dispersant, the dispersion composition exhibited very high dispersion stability for the PET fibers. In contrast, in Comparative Example 5-2 where the polyalkylene oxide with no aryl group on the side chains was used as the dispersant and Comparative Example 5-3 where no dispersant was used, the dispersing ability for the PET fibers was much lower as compared with the case where the dispersant of the present invention was used.

Example 6

Preparation of Silica Dispersion Compositions

Components of dispersion compositions shown in Table 7 were mixed together, and the resultant mixtures were stirred at room temperature for 12 hours using a stirrer ("LABO Stirrer Model LR-41C (trade name, Yamato Scientific Co., Ltd.)". Thus, silica dispersion compositions of Examples 6-1 to 6-3 and Comparative Examples 6-4 to 6-9 were obtained.

Evaluation of Dispersion Stability

The dispersion compositions of Examples 6-1 to 6-3 and Comparative Examples 6-4 to 6-9 were allowed to stand still at room temperature for one week after the preparation. Then, the dispersion stability of each dispersion composition one week after the preparation was evaluated through visual observation. The visual evaluation was made based on the same evaluation criteria as in Example 2.

The dispersion compositions of Examples 6-1 to 6-3 and Comparative Examples 6-4 to 6-9 are shown in Table 7, together with the results of the evaluation.

TABLE 7

|  |  | Example | | | Comparative Example | | | | | |
|---|---|---|---|---|---|---|---|---|---|---|
|  |  | 6-1 | 6-2 | 6-3 | 6-4 | 6-5 | 6-6 | 6-7 | 6-8 | 6-9 |
| Dispersant | Dispersant 2 | 0.1 | 1 | 10 | — | — | — | — | — | — |
|  | Dispersant 4 | — | — | — | 0.1 | 1 | 10 | — | — | — |
|  | Dispersant 6 | — | — | — | — | — | — | 0.1 | 1 | 10 |
| Spherical fumed silica (*1) |  | 10 | 10 | 10 | 10 | 10 | 10 | 10 | 10 | 10 |
| Distilled water |  | 89.9 | 89 | 80 | 89.9 | 89 | 80 | 89.9 | 89 | 80 |
| Dispersoid/dispersion medium (*2) |  | 100 | 10 | 1 | 100 | 10 | 1 | 100 | 10 | 1 |
| Dispersion stability evaluation |  | A− | A | AA | C | C | C | C | C | C |

*The numerical values in Table 7 indicate the blended amounts (g).
(*1) "ADMAFINE SO-C2 (Admatechs Company Limited)"
(*2) The "dispersoid/dispersant" indicates the weight ratio (= the polymerization amount of the dispersoid/the polymerization amount of the dispersant).

As can be seen from Table 7, in Examples 6-1 to 6-3 where the polyalkylene oxides with aryl groups on the side chains were used as the dispersants, the dispersion compositions exhibited very high dispersion stability for the silica. In contrast, in Comparative Examples 6-4 to 6-9 where the polyalkylene oxide with no aryl group on the side chains were used as the dispersants, the dispersing abilities for the silica were much lower as compared with the cases where the dispersants of the present invention were used. The dispersion compositions of Examples 6-1 to 6-3 were applied onto PET films as bases. Each of the thus-formed coating films maintained a favorable film shape. In particular, the coating film of Example 6-3 was a favorable film having resilience.

Example 7

Preparation of Pigment Dispersion Compositions

Components of dispersion compositions shown in Table 8 were mixed together, and the resultant mixtures were stirred at room temperature for 12 hours using a stirrer ("LABO Stirrer Model LR-41C (trade name, Yamato Scientific Co., Ltd.)". Thus, pigment dispersion compositions of Example 7-1 and Comparative Example 7-2 were obtained.

Evaluation of Dispersion Stability

The dispersion compositions of Examples 7-1 to 7-2 and Comparative Examples 7-3 to 7-4 were allowed to stand still at room temperature for one week after the preparation. Then, the whole amount of each dispersion composition was filtered through a filter paper ("Filter Paper No. 2 φ90 mm (trade name, Advantech Co., Ltd.)", and the presence of aggregates on the filter paper was checked though visual observation. The visual evaluation was made on the basis of the following evaluation criteria.

○: No aggregates (flocculated particles) were observed.
×: Aggregates (flocculated particles) were observed.

TABLE 8

|  |  | Example | | Comparative Example | |
|---|---|---|---|---|---|
|  |  | 7-1 | 7-2 | 7-3 | 7-4 |
| Dispersant | 20 wt % dispersant 2 (*1) | 50 | 50 | — | — |
|  | 20 wt % dispersant 5 (*1) | — | — | 50 | 50 |
| Pigment (red) (*2) |  | 10 | — | 10 | — |
| Pigment (yellow) (*3) |  | — | 10 | — | 10 |

TABLE 8-continued

|  | Example | | Comparative Example | |
|---|---|---|---|---|
|  | 7-1 | 7-2 | 7-3 | 7-4 |
| Distilled water | 40 | 40 | 40 | 40 |
| Dispersoid/dispersant (*4) | 1 | 1 | 1 | 1 |
| Dispersion stability evaluation | ○ | ○ | x | x |

* The numerical values in Table 8 indicate the blended amounts (g).
(*1) Each "20 wt % dispersant" refers to the dispersant diluted with water in such a manner that the blended amount thereof would be 20 parts by weight with respect to 100 parts by weight of water.
(*2) "Cartaren Red 11162 pa (trade name, Clariant International Ltd.)"
(*3) "Cartaren Yellow 45342 pa20 (trade name, Clariant International Ltd.)"
(*4) The "dispersoid/dispersant" indicates the weight ratio (=the polymerization amount of the dispersoid/the polymerization amount of the dispersant).

As can be seen from Table 8, in Examples 7-1 to 7-2 where the polyalkylene oxides with aryl groups on the side chains were used as the dispersants, the dispersion compositions exhibited very high dispersion stability for the pigment. In contrast, when the polyalkylene oxides with no aryl group on the side chains were used as dispersants, the dispersing abilities for the pigment were much lower as compared with the cases where the dispersants of the present invention were used.

As specifically described in the above Examples, it was verified that the dispersants 1 to 3 and 7 (Examples), which are polyalkylene oxides in which phenyl glycidyl ether or N-glycidylphthalimide is copolymerized, are useful as dispersants. It is presumed that the dispersants 1 to 3 and 7 exhibited a dispersing effect with the configuration in which the moiety where phenyl glycidyl ether or N-glycidylphthalimide is copolymerized (the structural subunit A) adsorbs onto the dispersoid and the moiety where ethylene oxide is copolymerized (the structural subunit B) exhibits an affinity for water as a dispersion medium. In the dispersant 3, the copolymerization ratio of EO (ethylene oxide) was reduced to 51 mol % and the copolymerization ratio of PO (propylene oxide), which is more hydrophobic than EO, was increased to 39.2 mol %. However, the dispersant 3 still exhibited favorable dispersing ability in water. In contrast, the dispersants 4 to 6 (Comparative Examples) not containing the structural unit having an aromatic group (the structural subunit A) exhibited lower dispersing abilities than the dispersants 1 to 3 and 7 (Examples).

Example 8

Preparation of Inorganic Fiber Dispersion Compositions and Organic Fiber Dispersion Compositions Example 8-1

Carbon fibers (Toho Tenax Co., Ltd., trade name "Tenax HTS40", fiber diameter: 7 μm) were cut into a fiber length of 13 mm. Thus, chopped fibers were obtained.

1.0 g of the chopped fibers obtained by cutting the carbon fibers, 0.05 g of the dispersant 1, and 500 ml of distilled water were added to a mixer (TOSHIBA CORPORATION, trade name "MX-C20G") at room temperature. The resultant mixture was stirred for 2 minutes using a variable transformer with the voltage being controlled to 30 V. Thus, carbon fiber slurry was obtained.

The thus-obtained carbon fiber slurry was diluted with water (the amount of the water: 5000 ml). The diluted slurry was formed into a paper sheet with a basis weight of 20 g/m² using a TAPPI-type square sheet machine (Yasuda Seiki Seisakusho LTD.). The thus-obtained carbon fiber sheet was dried. The formation of the sheet was evaluated by visual observation on the basis of the evaluation criteria to be described below.

Example 8-2

A carbon fiber sheet was produced in the same manner as in Example 8-1, except that the blended amount of the dispersant 1 was set to 0.10 g. The formation of the thus-obtained sheet was evaluated by visual observation.

Example 8-3

A carbon fiber sheet was produced in the same manner as in Example 8-1, except that the blended amount of the dispersant 1 was set to 0.20 g. The formation of the thus-obtained sheet was evaluated by visual observation.

Comparative Example 8-4

A carbon fiber sheet was produced in the same manner as in Example 8-1, except that the dispersant 5 was used instead of the dispersant 1. The formation of the thus-obtained sheet was evaluated by visual observation.

Comparative Example 8-5

A carbon fiber sheet was produced in the same manner as in Example 8-1, except that "Aron A-30SL (trade name)", which is ammonium polyacrylate, manufactured by Toagosei Co., Ltd. was used instead of the dispersant 1. The formation of the thus-obtained sheet was evaluated by visual observation.

Example 8-6

A glass fiber sheet was produced in the same manner as in Example 8-1, except that the following glass fibers were used instead of the carbon fibers. The formation of the thus-obtained sheet was evaluated by visual observation.
Glass fibers: Chopped fibers obtained by cutting glass fibers (Nippon Electric Glass Co., Ltd., trade name "ECS13S-552I", fiber diameter: 13 μm) into a fiber length of 13 mm.

Example 8-7

An aramid fiber sheet was produced in the same manner as in Example 8-1, except that the following aramid fibers were used instead of the carbon fibers. The formation of the thus-obtained sheet was evaluated by visual observation.
Aramid fibers: Chopped fibers obtained by cutting para-aramid fibers (Teijin Limited, trade name "TECHNORA", fiber diameter: 12 μm) into a fiber length of 6 mm Evaluation of Formation The uniformity in formation was evaluated on a scale of one to seven shown below, in which "7 (Good)" means that the sheet formation is highly uniform and totally free of unevenness in fiber density (fiber flocculation) and "1 (Bad)" means that the sheet formation is highly nonuniform with unevenness in fiber density (fiber flocculation) being observed all over the sheet:
<highly uniform sheet formation> 7, 6, 5, 4, 3, 2, 1 <highly nonuniform sheet formation>. Table 9 below shows the results of the evaluation.

TABLE 9

|  |  | Example | | | Comparative Example | | Example 8-6 | Example 8-7 |
| --- | --- | --- | --- | --- | --- | --- | --- | --- |
|  |  | 8-1 | 8-2 | 8-3 | 8-4 | 8-5 | Glass fibers | Aramid fibers |
|  |  | | | Carbon fibers | | | | |
| Dispersant | Dispersant 1 | 0.05 | 0.10 | 0.20 |  |  | 0.05 | 0.05 |
|  | Dispersant 5 |  |  |  | 0.05 |  |  |  |
|  | Ammonium polyacrylate |  |  |  |  | 0.05 |  |  |
|  | Formation evaluation | 4 | 5 | 5 | 2 | 2 | 5 | 6 |

As can be seen from Table 9, in Examples 8-1 to 8-3 and Examples 8-6 to 8-7 where the polyalkylene oxides with aryl groups on the side chains(the dispersants of the present invention) were used as the dispersants, the dispersion compositions exhibited highly uniform dispersing abilities for the carbon fibers, the glass fibers, and the aramid fibers, and the fiber sheets obtained by subjecting the dispersion compositions to the wet papermaking process had uniform formation without unevenness in fiber density. In contrast, in Comparative Examples 8-4 to 8-5 where the polyalkylene oxide with no aryl group on the side chains and the polyacrylate were used, respectively, the dispersing abilities for the inorganic fibers and the organic fibers were much lower as compared with the cases where the dispersants of the present invention were used, and the fiber sheets obtained by subjecting the dispersion compositions to the wet papermaking process had nonuniform formation with unevenness in fiber density being observed all over the sheet.

INDUSTRIAL APPLICABILITY

As specifically described above, the dispersant according to the present invention can exhibit high dispersing ability as a dispersant for nano-carbon such as CNTs. The dispersant according to the present invention is applicable not only to nano-carbons such as CNTs but also to, e.g., dispersoids including inorganic fine particles, organic polymers, inorganic fibers such as carbon fibers and glass fibers, and organic fibers such as PET fibers and aramid fibers, and can exhibit high dispersing ability for these dispersoids. Thus, the dispersant according to the present invention is applicable to a broad range of technical fields, and can be used in various fields relating to, e.g., hybrid materials, surface protective materials, conductive pastes, conductive inks, sensors, precision analysis elements, optical memories, liquid crystal displays, nanomagnets, heat transfer media, high-performance catalysts for fuel cells, organic solar cells, nano-glass devices, abrasive agents, drug carriers, environmental catalysts, paints, printing inks, ink-jet inks, resists for color filters, inks for writing tools, optical thin films, adhesives, antireflection films, hard coat films, and materials for fiber-reinforced plastics.

The invention claimed is:

1. A dispersant comprising:
a polyalkylene oxide having a weight-average molecular weight of 4,000 or more, the polyalkylene oxide having a structural unit of the following chemical formula (1):

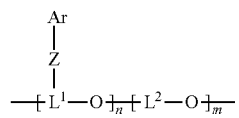
(1)

where in the chemical formula (1),
$L^1$ is a straight-chain alkylene group in which at least one hydrogen atom is substituted with Z—Ar, and $L^1$ may or may not have a substituent other than Z—Ar,
$L^2$ is a straight-chain alkylene group in which at least one hydrogen atom may or may not be substituted with a substituent,
there may be one or more Z—Ar's, and when there are a plurality of Z—Ar's, they may be the same or different from each other,
Z is a linking group that links $L^1$ and Ar, and the linking group may or may not contain each of an alkylene chain, an ether bond, an ester bond, and an imide bond,
Ar is represented by the following chemical formula (1a), (1b), or (1c); there may be one or more Ar's for one Z; when there are a plurality of Ar's, they may be the same or different from each other; and a naphthyl group in the following chemical formula (1b) may be either a 1-naphthyl group or a 2-naphthyl group,

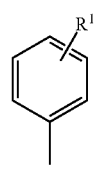
(1a)

-continued

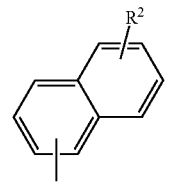
(1b)

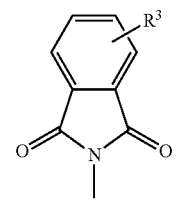
(1c)

$R^1$, $R^2$, and $R^3$ are each a substituent; there may be one or more of each of $R^1$, $R^2$, and $R^3$, or $R^1$, $R^2$, and $R^3$ each may not be present; and when there are a plurality of $R^1$s, $R^2$s, and $R^3$s, $R^1$s, $R^2$s, and $R^3$s may be the same or different from each other, respectively,
n and m are each an integer of 1 or more,
a sequence of $L^1$ and $L^2$ is not particularly limited, and may be any of alternating, random, or block sequences, and there may be one or more types of $L^1$s and $L^2$s, respectively,
wherein, in the chemical formula (1), $R^1$, $R^2$, and, $R^3$ are each at least one substituent selected from the group consisting of alkyl groups, unsaturated aliphatic hydrocarbon groups, alkoxy groups, alkoxyalkyl groups, halogens, acyl groups, and haloalkyl groups.

2. A fiber sheet obtained by subjecting a dispersion composition to a wet papermaking process, the dispersion composition comprising:
a dispersant comprising:
a polyalkylene oxide having a weight-average molecular weight of 4,000 or more, the polyalkylene oxide having a structural unit of the following chemical formula (1):

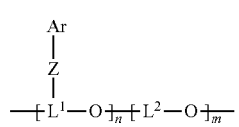
(1)

where in the chemical formula (1),
$L^1$ is a straight-chain alkylene group in which at least one hydrogen atom is substituted with Z—Ar, and $L^1$ may or may not have a substituent other than Z—Ar,
$L^2$ is a straight-chain alkylene group in which at least one hydrogen atom may or may not be substituted with a substituent,
there may be one or more Z—Ar's, and when there are a plurality of Z—Ar's, they may be the same or different from each other,
Z is a linking group that links $L^1$ and Ar, and the linking group may or may not contain each of an alkylene chain, an ether bond, an ester bond, and an imide bond,
Ar is represented by the following chemical formula (1a), (1b), or (1c); there may be one or more Ar's for one Z; when there are a plurality of Ar's, they may be the same or different from each other; and a naphthyl group in the following chemical formula (1b) may be either a 1-naphthyl group or a 2-naphthyl group,

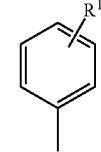

(1a)

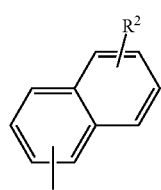

(1b)

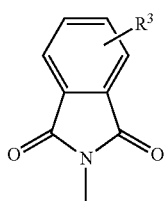

(1c)

$R^1$, $R^2$, and $R^3$ are each a substituent; there may be one or more of each of $R^1$, $R^2$, and $R^3$, or $R^1$, $R^2$, and $R^3$ each may not be present; and when there are a plurality of $R^1$s, $R^2$s, and $R^3$s, $R^1$s, $R^2$s, and $R^3$s may be the same or different from each other, respectively, n and m are each an integer of 1 or more, a sequence of $L^1$ and $L^2$ is not particularly limited, and may be any of alternating, random, or block sequences, and there may be one or more types of $L^1$s and $L^2$s, respectively;

at least one of inorganic fibers or organic fibers; and a dispersion medium.

3. A dispersant composition comprising:

an aqueous dispersion media;

a dispersoid dispersed throughout the dispersant composition, the dispersoid selected from the group consisting of a nano-carbon, metal nanoparticles, inorganic fibers, and organic fibers; and a polyalkylene oxide having a structural unit of the following chemical formula (1):

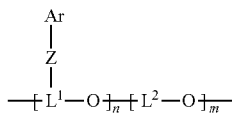

(1)

wherein in the chemical formula (1), $L^1$ is a straight-chain alkylene group in which at least one hydrogen atom is substituted with Z—Ar, and $L^1$ may or may not have a substituent other than Z—Ar, $L^2$ is a straight-chain alkylene group in which at least one hydrogen atom may or may not be substituted with a substituent, there may be one or more Z—Ar's, and when there are a plurality of Z—Ar's, they may be the same or different from each other, Z is a linking group that links $L^1$ and Ar, or alternatively, Z may not be present and $L^1$ and Ar may be linked directly to each other; and the linking group may or may not contain each of an alkylene chain, an ether bond, an ester bond, and an imide bond, Ar is represented by the following chemical formula (1a), (1b), or (1c); there may be one or more Ar's for one Z; when there are a plurality of Ar's, they may be the same or different from each other; and a naphthyl group in the following chemical formula (1b) may be either a 1-naphthyl group or a 2-naphthyl group,

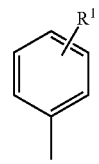

(1a)

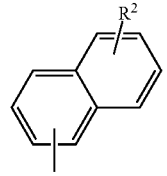

(1b)

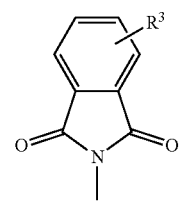

(1c)

$R^1$, $R^2$, and $R^3$ are each a substituent; there may be one or more of each of $R^1$, $R^2$, and $R^3$, or $R^1$, $R^2$, and $R^3$ each may not be present; and when there are a plurality of $R^1$s, $R^2$s, and $R^3$s, $R^1$s, $R^2$s, and $R^3$s may be the same or different from each other, respectively, n and m are each an integer of 1 or more, a sequence of $L^1$ and $L^2$ is not particularly limited, and may be any of alternating, random, or block sequences, and there may be one or more types of $L^1$s and $L^2$s, respectively, wherein the inorganic fibers are at least one type selected from the group consisting of carbon fibers, glass fibers, metal fibers, ceramic fibers, and basalt fibers, and the organic fibers are at least one selected from the group consisting of polyester fibers, cellulose fibers, aramid fibers, and polyvinylidene fluoride fibers.

4. The dispersant composition according to claim 3, wherein, in the chemical formula (1), $L^1$ and $L^2$ are each a straight-chain alkylene group having 1 to 4 carbon atoms.

5. The dispersant composition according to claim 3, wherein, in the chemical formula (1), the substituent on $L^2$ is at least one substituent selected from the group consisting of alkyl groups, unsaturated aliphatic hydrocarbon groups, haloalkyl groups, alkoxy groups, acyl groups, acyloxy groups, alkoxycarbonyl groups, alkenyloxycarbonyl groups, alkoxyalkyl groups, alkenyloxyalkyl groups, alkynyloxyalkyl groups, haloalkoxyalkyl groups, alkoxy-poly(alkyloxy)alkyl groups, acyloxyalkyl groups, halogens, (meth)acryloyloxyalkyl group, and (meth)acryloyloxyalkoxyalkyl groups.

6. The dispersant composition according to claim 3, wherein, in the chemical formula (1), a structural unit composed of -[$L^1$-O]$_n$- and Z—Ar is at least one selected from the group consisting of the following chemical formulae (1-1), (1-3), (1-4), (1-6), (1-7), (1-8), and (2):

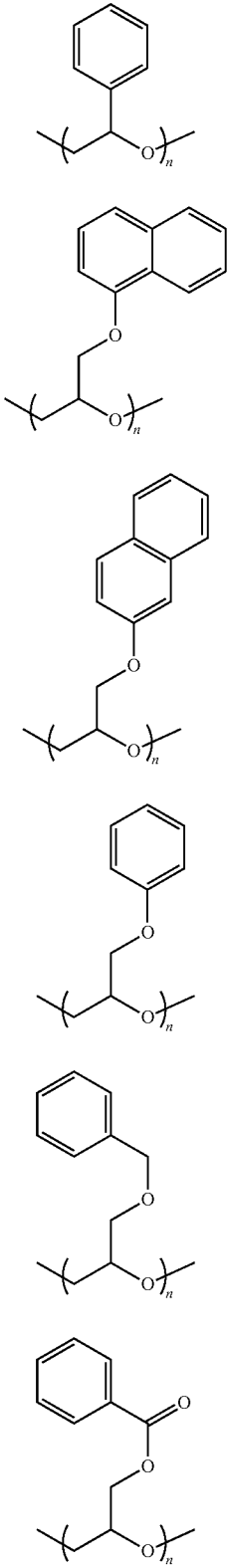

(1-1)
(1-3)
(1-4)
(1-6)
(1-7)
(1-8)

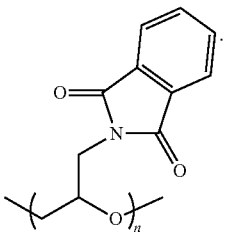

(2)

7. The dispersant composition according to claim 3, wherein the structural unit of the chemical formula (1) is any one of the following structural units (A1) to (A27), provided that the sequence of monomer structural units in the following structural unit (A1) to (A27) is not particularly limited and may be alternating, random, or block:

(A1) a copolymer of an ethylene oxide and a styrene oxide;
(A2) a copolymer of a propylene oxide and a styrene oxide;
(A3) a copolymer of an ethylene oxide, a propylene oxide and a styrene oxide;
(A4) a copolymer of an ethylene oxide, a butylene oxide, and a styrene oxide
(A5) a copolymer of an ethylene oxide, an alkyl glycidyl ether having 1 to 18 alkyl carbon atoms, and a styrene oxide;
(A6) a copolymer of an ethylene oxide, an allyl glycidyl ether, and a styrene oxide;
(A7) a copolymer of an ethylene oxide and a phenyl glycidyl ether;
(A8) a copolymer of a propylene oxide and a phenyl glycidyl ether;
(A9) a copolymer of an ethylene oxide, a propylene oxide, and a phenyl glycidyl ether;
(A10) a copolymer of an ethylene oxide, a butylene oxide, and a phenyl glycidyl ether;
(A11) a copolymer of an ethylene oxide, an alkyl glycidyl ether having 1 to 18 alkyl carbon atoms, and a phenyl glycidyl ether;
(A12) a copolymer of an ethylene oxide, an allyl glycidyl ether, and a phenyl glycidyl ether;
(A13) a copolymer of an ethylene oxide and a naphthyl glycidyl ether;
(A14) a copolymer of a propylene oxide and a naphthyl glycidyl ether;
(A15) a copolymer of an ethylene oxide, a propylene oxide, and a naphthyl glycidyl ether;
(A16) a copolymer of an ethylene oxide, a butylene oxide, and a naphthyl glycidyl ether;
(A17) a copolymer of an ethylene oxide, an alkyl glycidyl ether having 1 to 18 alkyl carbon atoms, and a naphthyl glycidyl ether;
(A18) a copolymer of an ethylene oxide, an allyl glycidyl ether, and a naphthyl glycidyl ether;
(A19) a copolymer of an ethylene oxide and an N-glycidylphthalimide;
(A20) a copolymer of a propylene oxide and an N-glycidylphthalimide;
(A21) a copolymer of an ethylene oxide, a propylene oxide, and an N-glycidylphthalimide;
(A22) a copolymer of an ethylene oxide, a butylene oxide, and an N-glycidylphthalimide;
(A23) a copolymer of an ethylene oxide, an alkyl glycidyl ether having 1 to 18 alkyl carbon atoms, and an N-glycidylphthalimide;

(A24) a copolymer of an ethylene oxide, an allyl glycidyl ether, and an N-glycidylphthalimide;

(A25) a copolymer of an ethylene oxide, a styrene oxide, and an N-glycidylphthalimide;

(A26) a copolymer of an ethylene oxide, a phenyl glycidyl ether, and an N-glycidylphthalimide; and (A27) a copolymer of an ethylene oxide, a naphthyl glycidyl ether, and an N-glycidylphthalimide.

8. A method for dispersing a dispersoid, comprising mixing the dispersoid with the dispersant composition according to claim 3.

9. The method for dispersing a dispersoid according to claim 8, wherein the dispersoid comprises at least one of inorganic fibers or organic fibers.

10. The method for dispersing a dispersoid according to claim 9, wherein:
the inorganic fibers are at least one type selected from the group consisting of carbon fibers, glass fibers, metal fibers, ceramic fibers, and basalt fibers, and
the organic fibers are at least one selected from the group consisting of polyester fibers, cellulose fibers, aramid fibers, and polyvinylidene fluoride fibers.

11. A method for producing a dispersion composition, comprising mixing a dispersoid and the dispersant composition according to claim 3.

12. The method for producing a dispersion composition according to claim 11, wherein the dispersoid comprises at least one of inorganic fibers or organic fibers.

13. The method for producing a dispersion composition according to claim 12, wherein:
the inorganic fibers are at least one type selected from the group consisting of carbon fibers, glass fibers, metal fibers, ceramic fibers, and basalt fibers, and
the organic fibers are at least one selected from the group consisting of polyester fibers, cellulose fibers, aramid fibers, and polyvinylidene fluoride fibers.

14. A dispersant comprising:
a polyalkylene oxide having a structural unit of the following chemical formula (1), wherein the dispersant is for use as at least one selected from the group consisting of a dispersant for a nano-carbon, a dispersant for metal nanoparticles, a dispersant for inorganic fibers, and a dispersant for organic fibers:

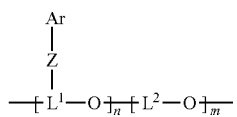
(1)

where in the chemical formula (1),
$L^1$ is a straight-chain alkylene group in which at least one hydrogen atom is substituted with Z—Ar, and $L^1$ may or may not have a substituent other than Z—Ar,
$L^2$ is a straight-chain alkylene group in which at least one hydrogen atom may or may not be substituted with a substituent,
there may be one or more Z—Ar's, and when there are a plurality of Z—Ar's, they may be the same or different from each other,
Z is a linking group that links $L^1$ and Ar, or alternatively, Z may not be present and $L^1$ and Ar may be linked directly to each other; and the linking group may or may not contain each of an alkylene chain, an ether bond, an ester bond, and an imide bond,
Ar is represented by the following chemical formula (1a), (1b), or (1c); there may be one or more Ar's for one Z; when there are a plurality of Ar's, they may be the same or different from each other; and a naphthyl group in the following chemical formula (1b) may be either a 1-naphthyl group or a 2-naphthyl group,

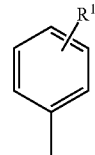
(1a)

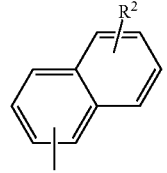
(1b)

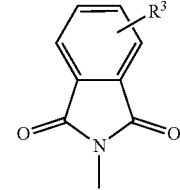
(1c)

$R^1$, $R^2$, and $R^3$ are each a substituent; there may be one or more of each of $R^1$, $R^2$, and $R^3$, or $R^1$, $R^2$, and $R^3$ each may not be present; and when there are a plurality of $R^1$s, $R^2$s, and $R^3$s, $R^1$s, $R^2$s, and $R^3$s may be the same or different from each other, respectively,
n and m are each an integer of 1 or more,
a sequence of $L^1$ and $L^2$ is not particularly limited, and may be any of alternating, random, or block sequences, and there may be one or more types of $L^1$s and $L^1$s, respectively,
wherein, in the chemical formula (1), $R^1$, $R^2$, and, $R^3$ are each at least one substituent selected from the group consisting of alkyl groups, unsaturated aliphatic hydrocarbon groups, alkoxy groups, alkoxyalkyl groups, halogens, acyl groups, and haloalkyl groups.

15. A fiber sheet obtained by subjecting a dispersion composition to a wet papermaking process, the dispersion composition comprising:
a dispersant comprising:
a polyalkylene oxide having a structural unit of the following chemical formula (1), wherein the dispersant is for use as at least one selected from the group consisting of a dispersant for a nano-carbon, a dispersant for metal nanoparticles, a dispersant for inorganic fibers, and a dispersant for organic fibers:

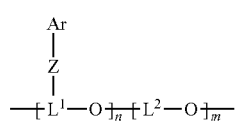
(1)

where in the chemical formula (1),
$L^1$ is a straight-chain alkylene group in which at least one hydrogen atom is substituted with Z—Ar, and $L^1$ may or may not have a substituent other than Z—Ar,
$L^2$ is a straight-chain alkylene group in which at least one hydrogen atom may or may not be substituted with a substituent, there may be one or more Z—Ar's, and when there are a plurality of Z—Ar's, they may be the same or different from each other, Z is a linking group that links $L^1$ and Ar, or alternatively, Z may not be present and $L^1$ and Ar may be linked directly to each other; and the linking group may or may not contain each of an alkylene chain, an ether bond, an ester bond, and an imide bond, Ar is represented by the following chemical formula (1a), (1b), or (1c); there may be one or more Ar's for one Z; when there are a plurality of Ar's, they may be the same or different from each other; and a naphthyl group in the following chemical formula (1b) may be either a 1-naphthyl group or a 2-naphthyl group,

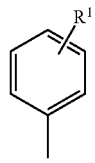
(1a)

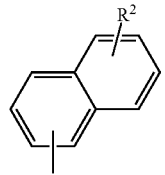
(1b)

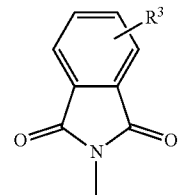
(1c)

$R^1$, $R^2$, and $R^3$ are each a substituent; there may be one or more of each of $R^1$, $R^2$, and $R^3$, or $R^1$, $R^2$, and $R^3$ each may not be present; and when there are a plurality of $R^1$s, $R^2$s, and $R^3$s, $R^1$s, $R^2$s, and $R^3$s may be the same or different from each other, respectively, n and m are each an integer of 1 or more, a sequence of $L^1$ and $L^2$ is not particularly limited, and may be any of alternating, random, or block sequences, and there may be one or more types of $L^1$s and $L^2$s, respectively;

at least one of inorganic fibers or organic fibers; and a dispersion medium.

* * * * *